(12) United States Patent
Pisupati et al.

(10) Patent No.: US 7,093,245 B2
(45) Date of Patent: Aug. 15, 2006

(54) SYSTEM AND APPARATUS FOR UPGRADING CONCENTRATED EXECUTABLE COMPUTER SOFTWARE CODE WITHOUT RECONCENTRATION

(75) Inventors: Ravikumar Pisupati, San Jose, CA (US); Dongni Chen, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 670 days.

(21) Appl. No.: 10/300,258

(22) Filed: Nov. 20, 2002

(65) Prior Publication Data

US 2004/0098705 A1    May 20, 2004

(51) Int. Cl.
*G06F 9/44* (2006.01)
(52) U.S. Cl. ...................... 717/168; 717/169
(58) Field of Classification Search ........ 717/170–172, 717/110, 111, 116, 124, 130, 139, 140, 158, 717/165; 707/100, 101, 204
See application file for complete search history.

(56) References Cited

U.S. PATENT DOCUMENTS

| | | | | | |
|---|---|---|---|---|---|
| 6,072,953 | A | * | 6/2000 | Cohen et al. | 717/166 |
| 6,081,665 | A | * | 6/2000 | Nilsen et al. | 717/116 |
| 6,128,771 | A | * | 10/2000 | Tock et al. | 717/111 |
| 6,163,780 | A | * | 12/2000 | Ross | 707/101 |
| 6,260,187 | B1 | * | 7/2001 | Cirne | 717/110 |
| 6,535,894 | B1 | * | 3/2003 | Schmidt et al. | 707/204 |
| 6,658,421 | B1 | * | 12/2003 | Seshadri | 707/100 |
| 6,865,735 | B1 | * | 3/2005 | Sirer et al. | 717/158 |
| 6,915,510 | B1 | * | 7/2005 | Tock et al. | 717/165 |

* cited by examiner

*Primary Examiner*—Wei Zhen
*Assistant Examiner*—Anna Deng

(57) ABSTRACT

In upgrading a concentrated executable computer code with an upgrade code, a first indexed list is created of a plurality of index references corresponding to first identifiers of the first type code structures in the concentrated code, the first indexed list further containing upgrade flags to indicate whether corresponding first type code structures identified by the first identifiers have been upgraded. A first indexed upgrade list is created of a plurality of index references corresponding to first identifiers of the first type code structures in the upgrade code. A state of each upgrade flag is set to indicate whether a corresponding first identifier in the first indexed list has been upgraded based on comparing the first identifiers in the first indexed upgrade list with the first identifiers in the first indexed list.

11 Claims, 22 Drawing Sheets

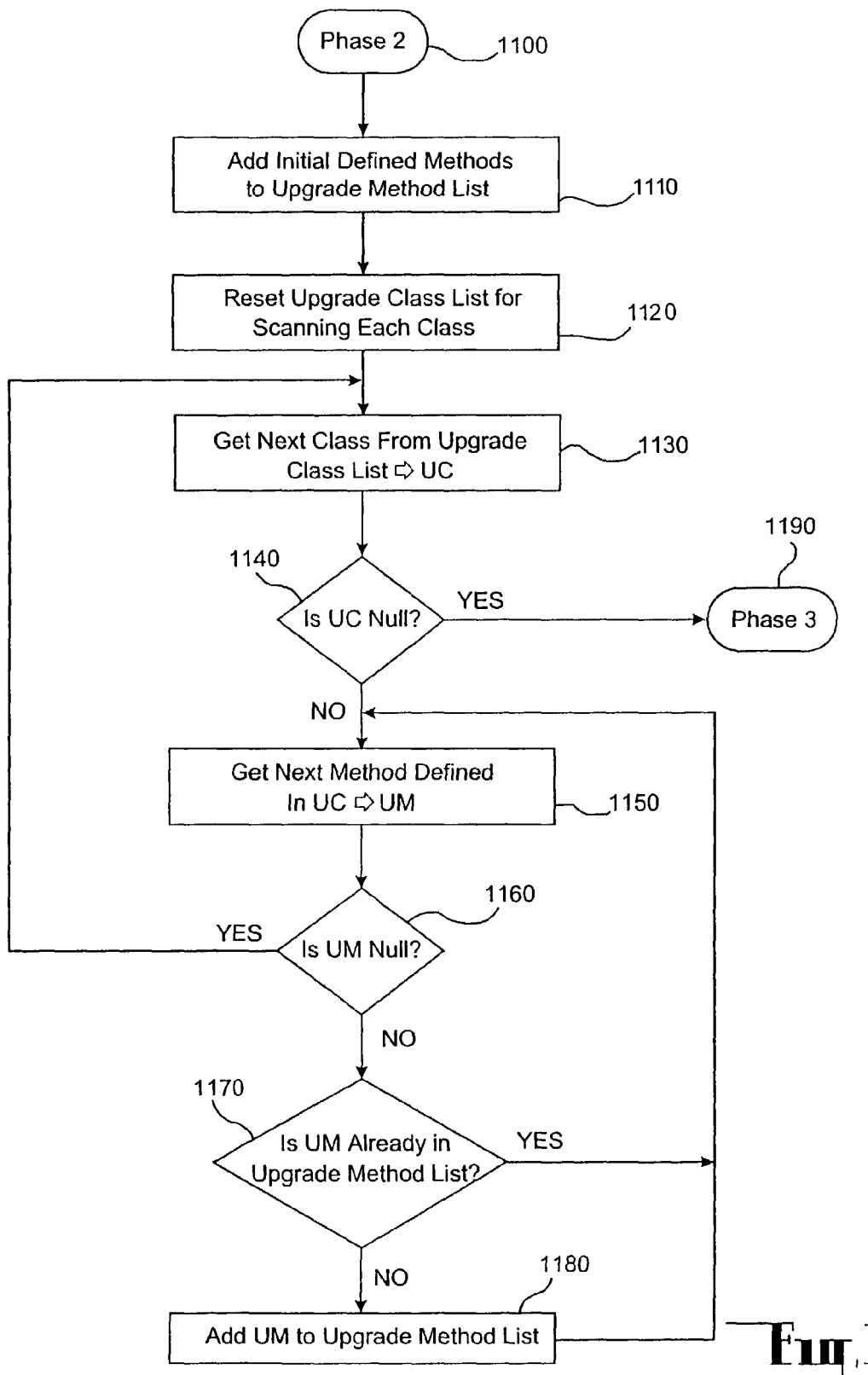

US 7,093,245 B2

SYSTEM AND APPARATUS FOR UPGRADING CONCENTRATED EXECUTABLE COMPUTER SOFTWARE CODE WITHOUT RECONCENTRATION

FIELD OF THE INVENTION

The present invention relates to a system and apparatus for upgrading concentrated executable computer software code without reconcentration. The invention is particularly useful in upgrading bytecode and computer software written in an object-oriented language, such as JAVA.

DICTIONARY

The following dictionary is to be used in interpreting this specification:

"bytecode" is computer software code.

"class", or "classes", are code segments that contain method definitions and field specifications.

"comprise", or variations such as "comprises" or "comprising", will be understood to imply the inclusion of a stated integer or group of integers but not the exclusion of any other integer or group of integers.

"electronic communications network" or "ECN" will be understood to include any computing, multimedia or video system in which a user can remotely access or receive transmissions of bytecode.

"field" is a component of an object in which object data are stored as integers or characters, i.e., variables.

"identifier" means a reference to the name of a unique class, method or field.

"instance", when used in the context of data, refers to data associated with an object.

"method" is code used to perform a particular task, such as modifying data in some way, such as for performing a procedure or a function.

"object" is a collection of fields and methods that operate on fields. An object is also an instance of a class.

"private", when used in the context of data, refers to data generally accessible by a single class.

"public", when used in the context of data, refers to data accessible by multiple classes.

"static", when used in the context of data, refers to data associated with each class.

BACKGROUND OF THE INVENTION

In U.S. Pat. No. 6,163,780, the Hewlett-Packard Company of Palo Alto, Calif. describe a system for concentrating executable computer software code. This system involves parsing the computer software code by means of concentrating software. The concentrating software achieves this by a series of scans of the computer software code.

The first scan identifies all unique classes referenced in the computer software code and includes the identifier of each such class into a "ClassList". The second scan searches for all unique methods (the identifiers of which are stored in a "MethodList") and the third scan searches for all unique Fields (the identifiers of which are stored in a "FieldList").

Every class identified in the ClassList is then scanned to determine whether there are references to further classes not recorded in the ClassList. If so, then the identifier for such classes is added to the ClassList. The process is then repeated in relation to the newly added classes. In this manner, all unique classes referenced in the computer software code are identified in the ClassList.

Once this scan has been completed, every class in the ClassList is again scanned, but this time to determine any further methods not recorded in the MethodList. If a method is found that is not included in the MethodList, then the identifier for the method is added to the MethodList. The process continues until all classes in the ClassList have been scanned for further methods.

A further scan is used to identify all further fields not included in the FieldList and add their identifier to the FieldList. This scan involves traversing all classes in the ClassList and every method in these classes to identify further fields. The ClassList, MethodList and FieldList are then each sorted and reformatted into a canonical list form. Each class, method and field in the ClassList, MethodList and FieldList, respectively, is also assigned a unique index reference (typically an integer corresponding to the position of the corresponding identifier within the appropriate canonical list).

Local data referenced by each method of each class are then stored in an array for each class. The local data reference in each method is then replaced with the index value of the location of the local data in the array. The computer software code can then be executed with class, method and field invocations being resolved as part of the execution process.

The problem with this arrangement is that the use of index references to corresponding canonical lists hinders upgrading of the computer software code. To illustrate, if an upgrade requires a class to be added, deleted or changed, then all the index values of classes in the condensed computer software code may be affected in such a manner that parts of the bytecode invoke the wrong class, method or field during execution.

Further, if the condensed computer software code is burned into a ROM, any change in the computer software code will require the ROM to be refreshed. This may not be possible, however, if the device is in the hands of the end-users.

Accordingly, there is a need to record only the information necessary to perform the upgrade and to use this information together with computer software code concentrated according to the system described above.

SUMMARY OF THE INVENTION

An object of the present invention is to provide a system for upgrading concentrated bytecode. The present invention also provides a system and method for interpreting and executing an upgraded version of the concentrated bytecode.

It is another object of the present invention to provide a system and method for removing classes, methods and/or fields that are unused or unneeded as a result of upgrading the concentrated bytecode.

Another object of the present invention is to provide a system and method for receiving bytecode comprising the upgrade, concentrating it, transmitting it via a computer network, such as the Internet, and integrating the concentrated bytecode comprising the upgrade with the original concentrated bytecode.

By providing a method and system for upgrading concentrated bytecode or computer code, the present invention alleviates to a great extent the need to reconcentrate bytecode or computer code when the bytecode or computer code needs to be upgraded.

In a preferred embodiment, list processing and indexing is used to create indexes of various code structures within an upgrade bytecode. Preferably, index listings for each of the code structures are created. The index listings contain listings of identifiers corresponding to the particular instances of the respective code structures in the upgrade bytecode and index references corresponding to each of the identifiers included in the listing. The upgrade bytecode is reduced in size by replacing identifiers representing code structures in the upgrade bytecode with the corresponding index references. Identifiers representing code structures not in the upgrade bytecode are replaced with corresponding references to indexes of the various code structures created when concentrating the original bytecode. In this way, for example, code structures are replaced with index references within the upgrade bytecode and an index containing newly created or modified data structures is maintained. The upgrade bytecode is then integrated with the original concentrated bytecode and modifications to the indexes of the various code structures created when concentrating the original bytecode are made, as appropriate, to note unused, unneeded and/or upgraded classes.

More particularly, in an embodiment applicable to typical JAVA-based computer code, or bytecode, the data structures include classes, methods and fields. Listings of the classes, methods and/or fields appearing in the JAVA bytecode are created by systematically reviewing the JAVA upgrade bytecode to identify each instance of a particular defined class, method and/or field, respectively. These listings are sorted to create respective canonical listings or indexes of the defined classes, methods and/or fields. These listings include reference indicators such as index locations or pointers, assigned to each of the classes, methods and/or fields in the respective sorted lists. The first entry in each of the sorted lists is also allocated a starting number so as to distinguish between entries in the canonical listings created for the upgrade bytecode and the canonical listings created for the original bytecode. The JAVA upgrade bytecode is revised so that the index locations of the classes, methods and/or fields replace the identifiers of the class, methods and/or fields originally defined in the upgrade bytecode. The index locations of other classes, methods and/or fields included in the canonical lists created when concentrating the original bytecode, replace the identifiers of the other class, methods and/or fields. To elaborate, and as an example, each class reference in the upgrade bytecode is replaced with a reference to the location of the class within the sorted upgrade class list, if the method is defined in the upgrade bytecode, or with a reference to the location of the class within the sorted original class list, if the method is defined in the original bytecode.

Furthermore, a scan of the upgrade bytecode may also preferably be performed for every class and method in the lists to identify and note in an array any local data or constants referenced in the upgrade bytecode. The data references for the local data or constants within the bytecode are changed to indicate the location in the array where the local data or constants have been placed. Thus, the local data or constant references in the JAVA upgrade bytecode are changed to array references.

The present invention also provides an interpreter for use in conjunction with the combination of the concentrated upgrade bytecode and the concentrated original bytecode. The interpreter of the present invention can execute bytecode concentrated in accordance with the concentration method or system of the present invention when combined with the concentration method or system of the invention described in U.S. Pat. No. 6,163,780.

These and other features of the invention will be appreciated from review of the following detailed description of the invention, along with the accompanying figures, in which like reference characters refer to like parts throughout.

BRIEF DESCRIPTION OF THE DRAWINGS

FIG. 12 is a flow diagram illustrating a second phase of a method of upgrading concentrated executable computer software code without reconcentration in accordance with the present invention.

DETAILED DESCRIPTION OF THE INVENTION

In accordance with the present invention, a system and method are provided for upgrading concentrated executable computer software code without the need to reconcentrate the concentrated bytecode. Such a system and method may be used in conjunction with various known computer languages and interpreters, including JAVA, various dialects of JAVA (such as the version available from Microsoft Corporation), and other languages.

Figure 1:
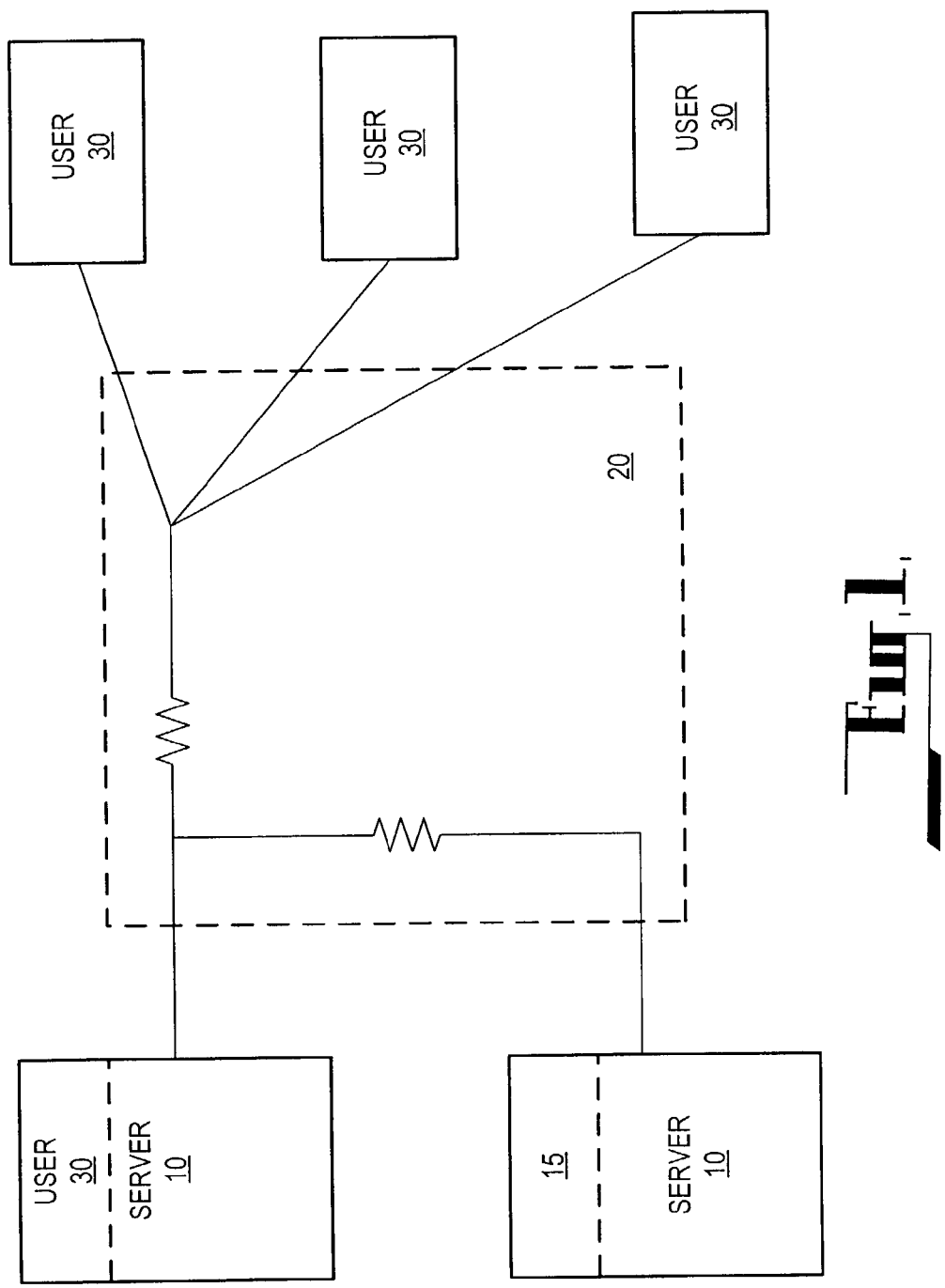
FIG. 1 is a block diagram illustrating an electronic communications network and server systems in accordance with the present invention.

As shown in FIG. 1, the bytecode the subject of the upgrade (referred to hereafter as the "upgrade bytecode") 74 may be stored within a server system 10, which is connected via an ECN 20 with user systems 30. For example, the ECN 20 may include cable transmission networks, telephone networks, an intranet, the Internet, or combinations thereof. It will be understood that an ECN 20 as described herein may include a single server computer, such as a single bulletin board system.

As illustrated in FIG. 1, a plurality of server systems 10 may be connected to the ECN 20 and a plurality of user systems 30 may also be connected. The servers 10 may perform a number of functions including storing data and/or web page information and so on. In a preferred embodiment, at least one of the servers 10 has an associated memory 15 which stores the upgrade bytecode 74 and which can transmit the upgrade bytecode 74 via the ECN 20 to a user system 30. As utilised in conjunction with the present invention, the server memory 15 stores a concentrated bytecode generated in accordance with the present invention. The server memory 15 may also store a concentrated bytecode generated in accordance with the invention the subject of U.S. Pat. No. 6,163,780 (described below).

Figure 2:
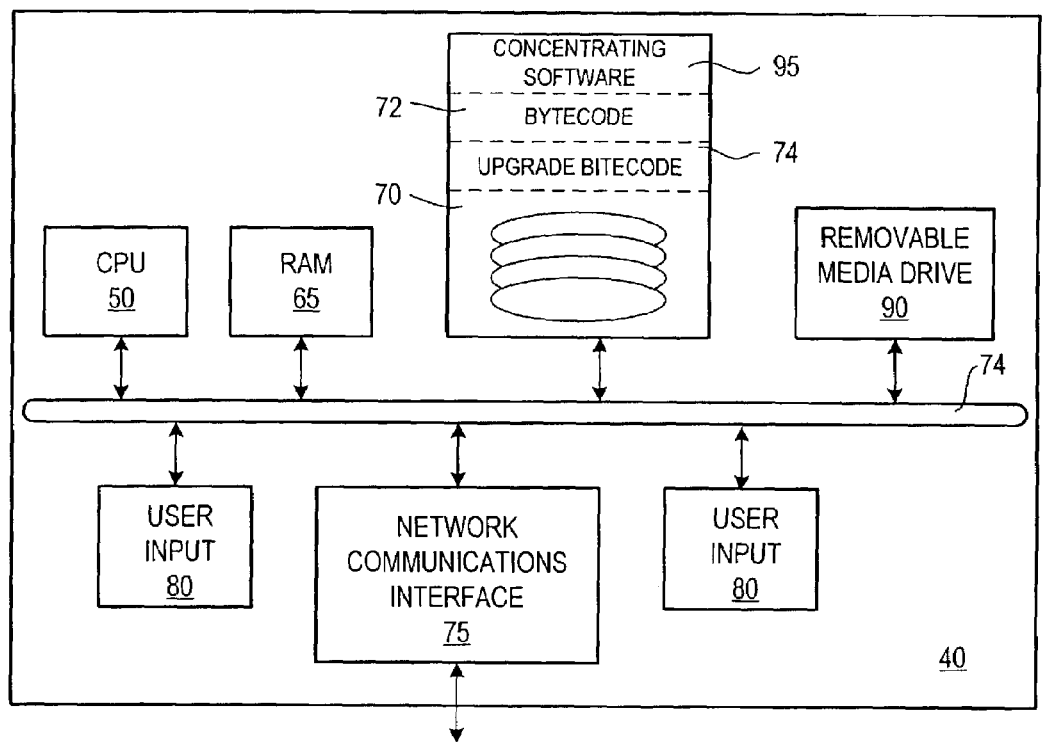
FIG. 2 is a system block diagram in accordance with the present invention.

The concentrated upgrade bytecode 74 may be transmitted via the ECN 20 to a user system 30. Preferably, the user system 30 contains an API for integrating the concentrated upgrade bytecode 74 with the concentrated original bytecode 72 and an interpreter or other associated tool for receiving the integrated concentrated bytecode 76 and executing it. The concentrated upgrade bytecode 74 generated in accordance with the present invention may be generated on a data processing system 40 as illustrated in FIG. 2. Typical data processing systems which may be used include personal computers, work stations, palm computers, personal digital assistants (PDAs) or even mainframe computers. Also, multiple systems coupled in a computer network, with data files shared among systems on the network, may be employed. Data processing systems can be used to practice the present invention utilizing a variety of operating systems (such as for example, Windows™, Windows NT™.,
Windows 95™., Windows XP™., Sun OS™, OS/2™. and Macintosh OS™) and programming languages.

As illustrated in FIG. 2, a typical data processing system 40 includes a central processing unit (CPU) 50. The CPU 50 is optionally connected via a bus 60 to, among other things, a volatile memory 65 (e.g., a RAM), non-volatile memory 70 (such as disk drives, CD-ROMs, flash memory, or data tape), a network communications interface 75 (such as a modem, T1 line interface, ISDN modem or cable modem), a user input device or devices 80 (such as a keyboard and/or a pointing or point-and-click device such as a mouse, light pen, touch screen, touch pad), a user output device or devices 87 (such as a video display screen and/or an audio speaker), and a removable media drive 90 (such as a floppy disk drive, CD-ROM drive, PCMCIA device, CD-WORM drive or data tape drive). The data processing system 40 can be a personal computer (PC).

The data processing system 40 may be a free-standing system, providing upgrade bytecode 74 concentrated in accordance with the present invention to a server 10 for transmission over the ECN 20. Alternatively, a server 10 may comprise the data processing system 40. Alternatively, the data processing system 40 may be in communication with user systems 30 via the ECN 20. In another embodiment, the data processing system 40 may receive upgrade bytecode 74, concentrate it on-the-fly in accordance with the present invention and then transmit it such as to a server 10, or to another system via the ECN 20.

Although the method and system of the present invention can be used to great advantage within a networked system, as in the illustrated embodiment, it should be clear that the code concentrating method and system of the present invention can also be used to advantage in non-networked computer systems.

The upgrade bytecode 74 to be concentrated in accordance with the present invention can be stored in the RAM 65, the non-volatile memory 70, or on the removable media 90. The upgrade bytecode to be concentrated may also be transmitted on-the-fly to the data processing system 40, which in turn concentrates the upgrade bytecode on-the-fly and re-transmits the concentrated upgrade bytecode 74. In the illustrated embodiment, the bytecode 72 to be concentrated is stored in the non-volatile memory 70. In some applications, it may be desirable to store the bytecode 72 in RAM for increased access speed.

The data processing system 40 also executes and preferably stores concentrating software 95 for concentrating the upgrade bytecode 74 in accordance with the present invention. The concentrating software 95 is illustrated in FIG. 2 as being stored in non-volatile memory 70. However, it should be understood that it can be stored in other ways such as in RAM 65 or on removable media inserted in the removable media drive 90.

Figure 3A:
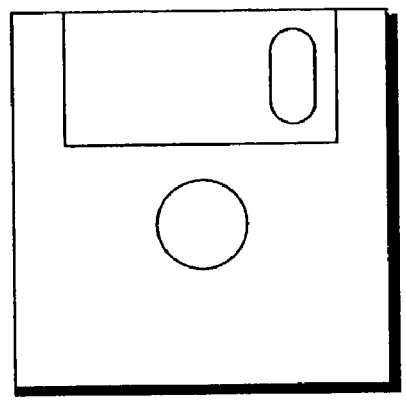
FIGS. 3A–3C are illustrations of various storage media upon which implementing code in accordance with the present invention can be stored.
Figure 3B:
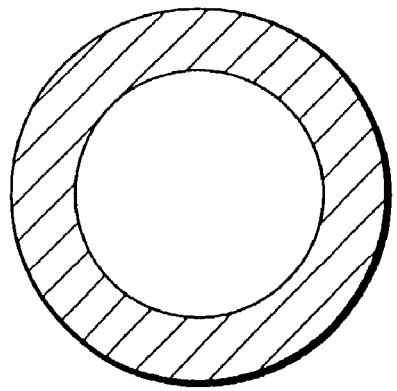
Figure 3C:
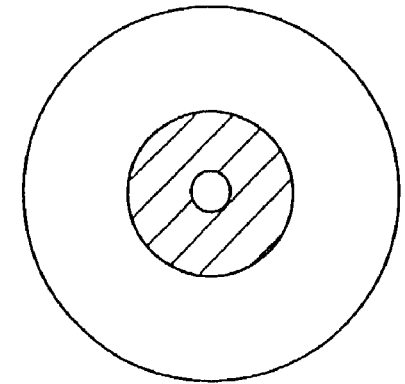
Figure 4:
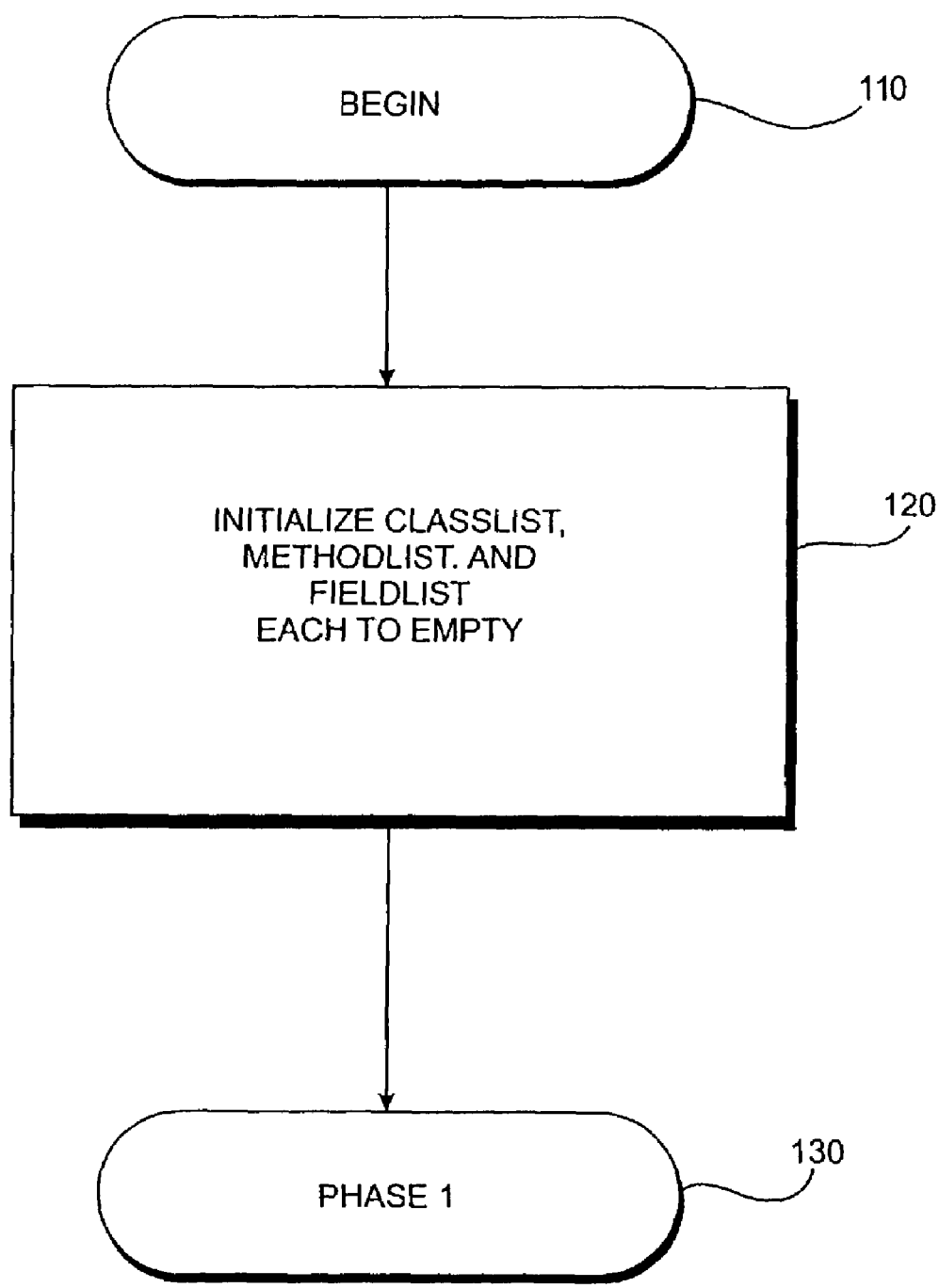
FIG. 4 is a flow diagram of a method of concentrating software in accordance with the invention described in U.S. Pat. No. 6,163,780.
Figure 5:
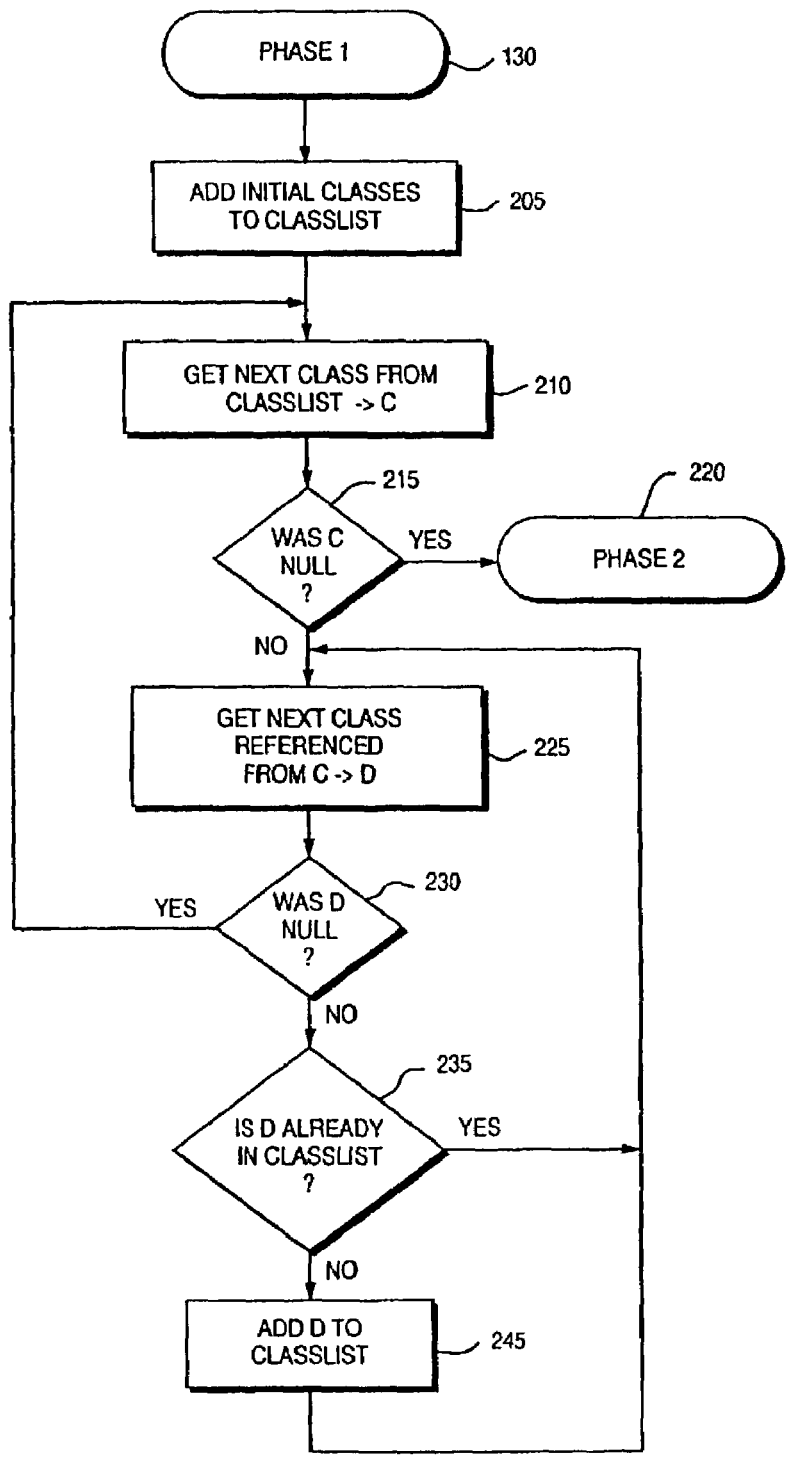
FIG. 5 is a flow diagram illustrating a first phase of a method of concentrating software in accordance with the invention described in U.S. Pat. No. 6,163,780.
Figure 6:
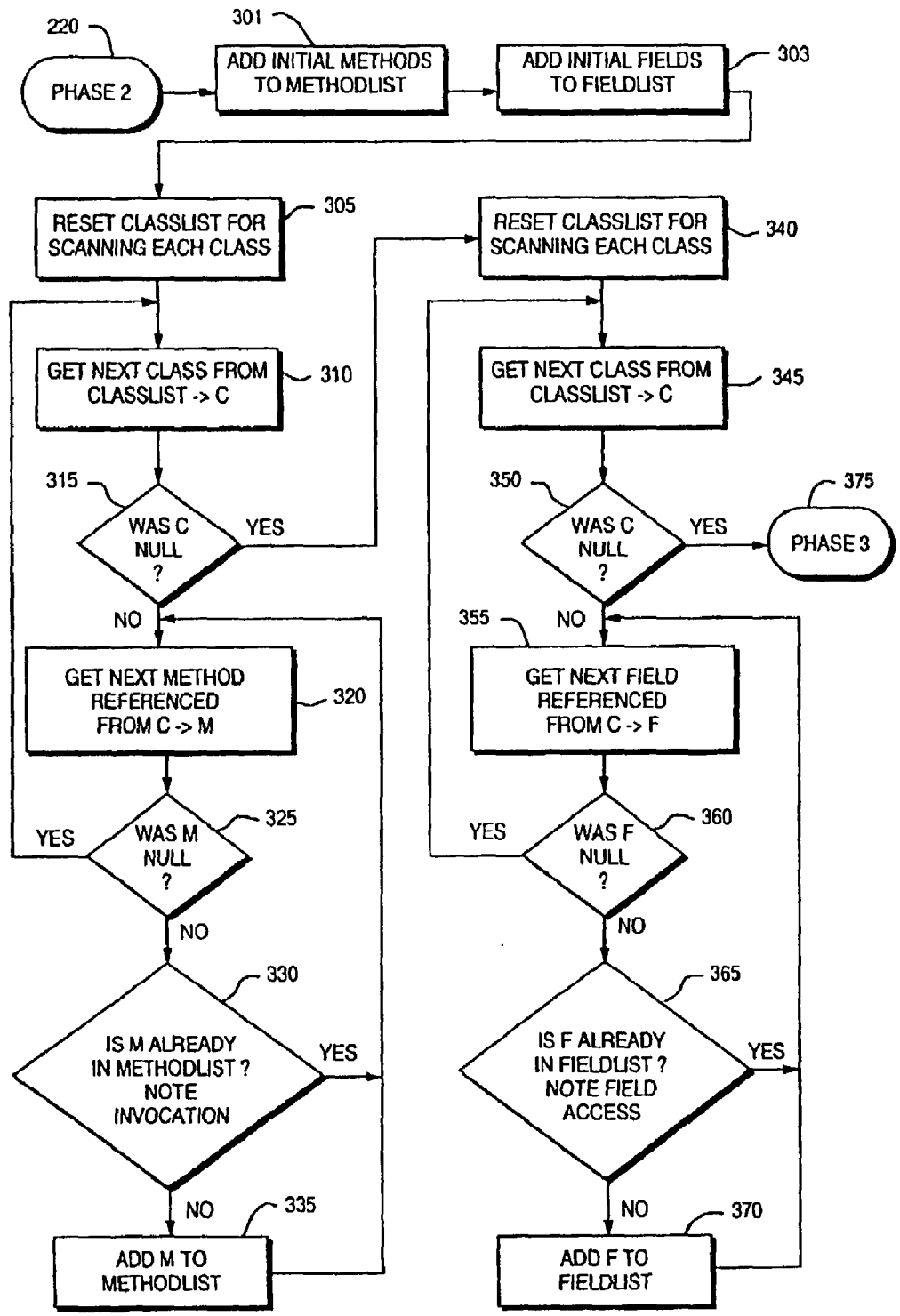
FIG. 6 is a flow diagram illustrating a second phase of a method of concentrating software in accordance with the invention described in U.S. Pat. No. 6,163,780.
Figure 7:
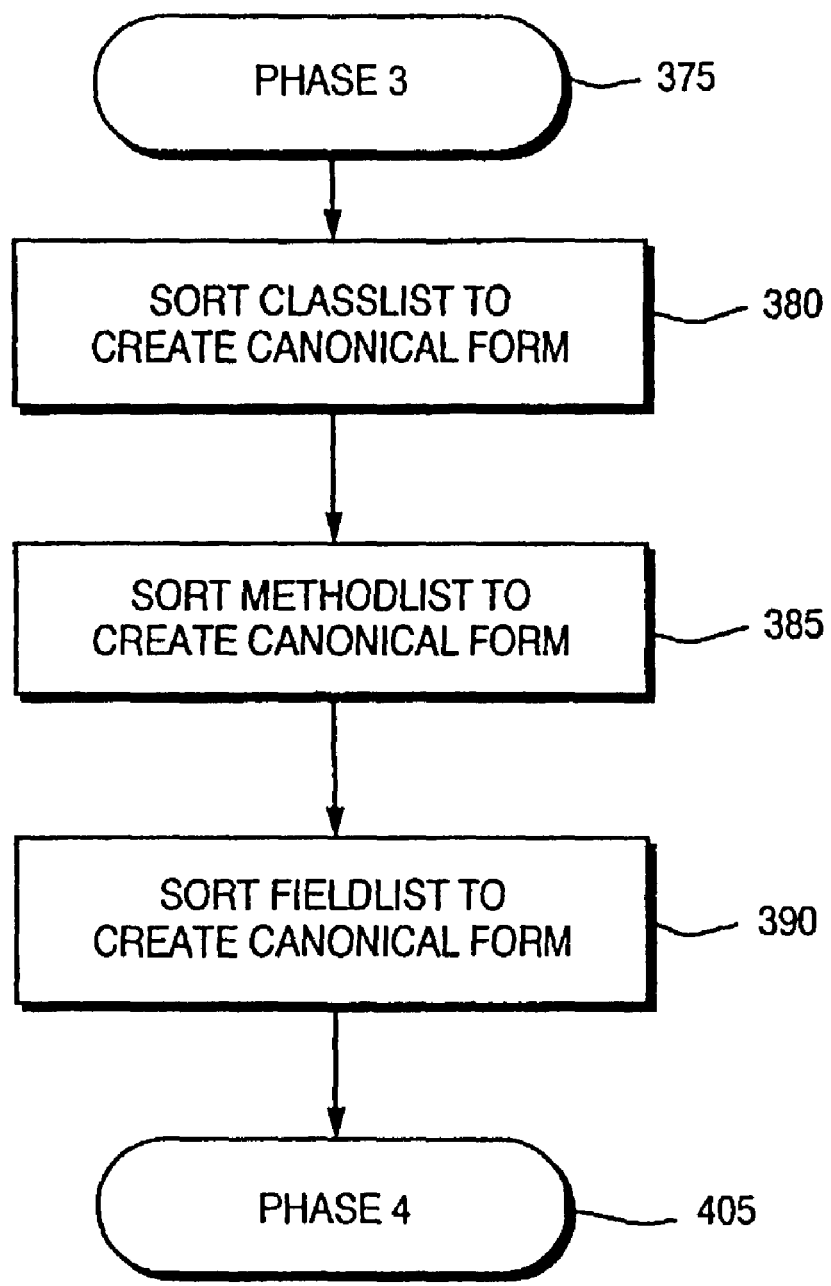
FIG. 7 is a flow diagram illustrating a third phase of a method of concentrating software in accordance with the invention described in U.S. Pat. No. 6,163,780.
Figure 8:
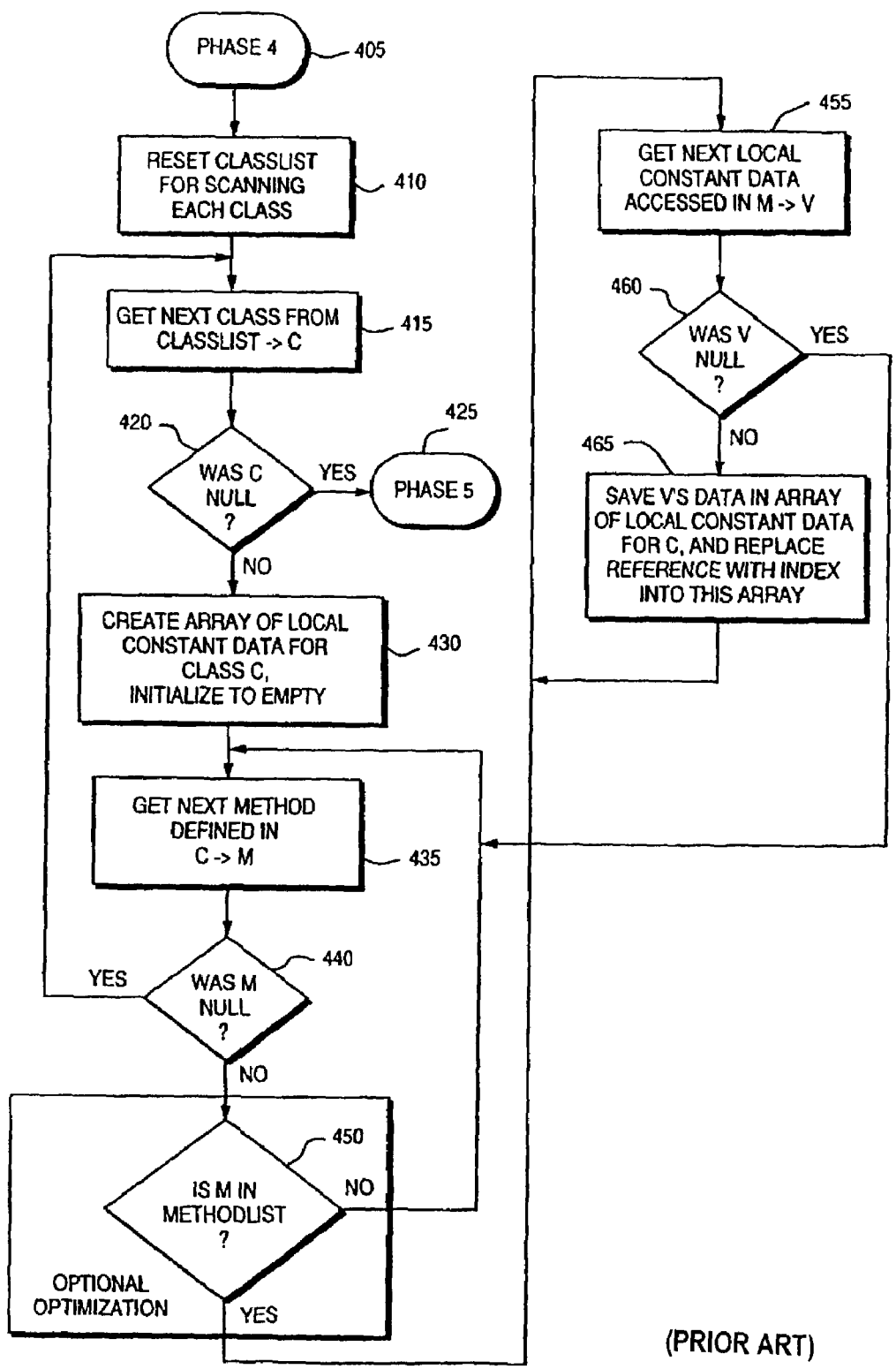
FIG. 8 is a flow diagram illustrating a fourth phase of a method of concentrating software in accordance with the invention described in U.S. Pat. No. 6,163,780.
Figure 9:
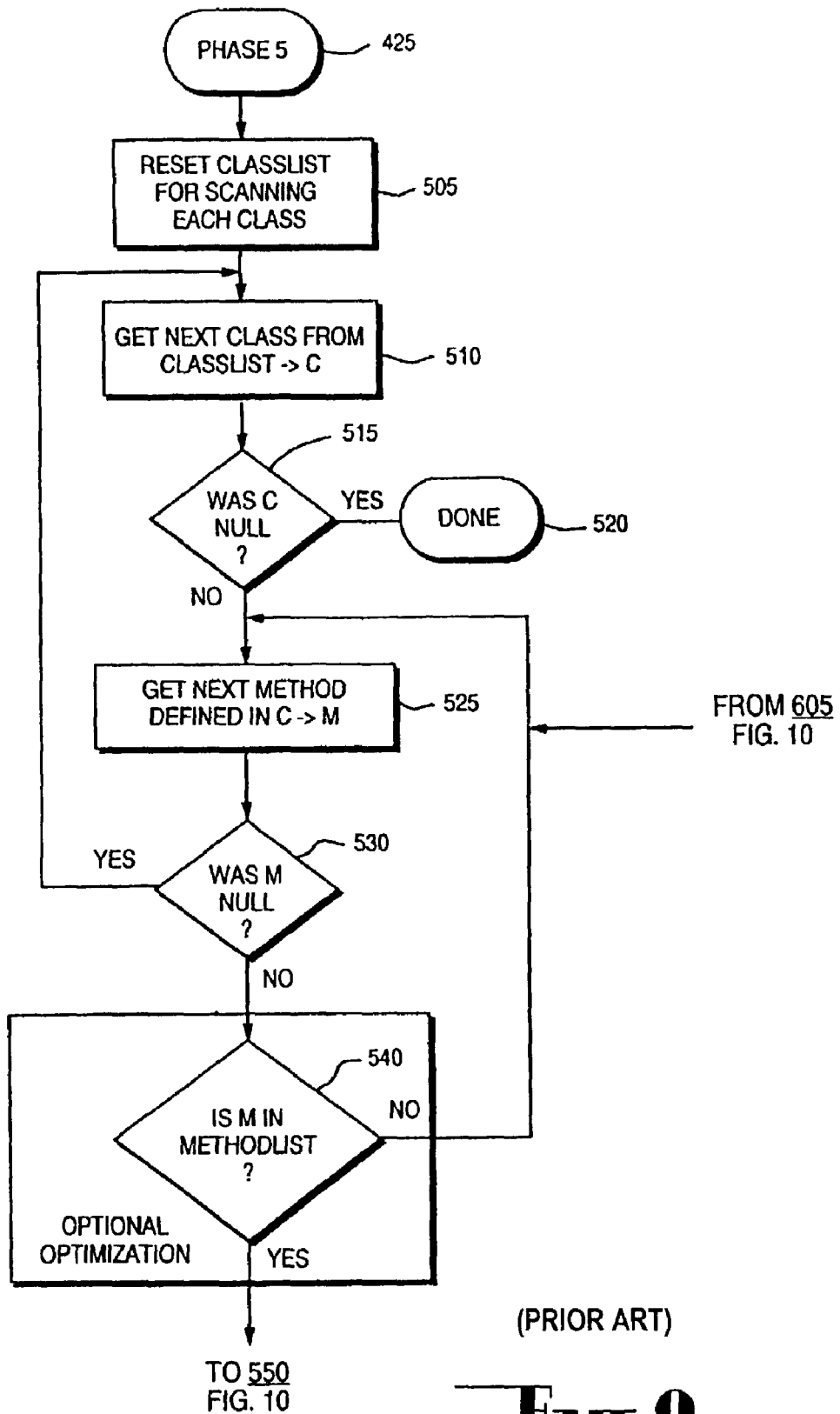
FIG. 9 is a flow diagram illustrating a first portion of a fifth phase of a method of concentrating software in accordance with the invention described in U.S. Pat. No. 6,163,780.
Figure 10:
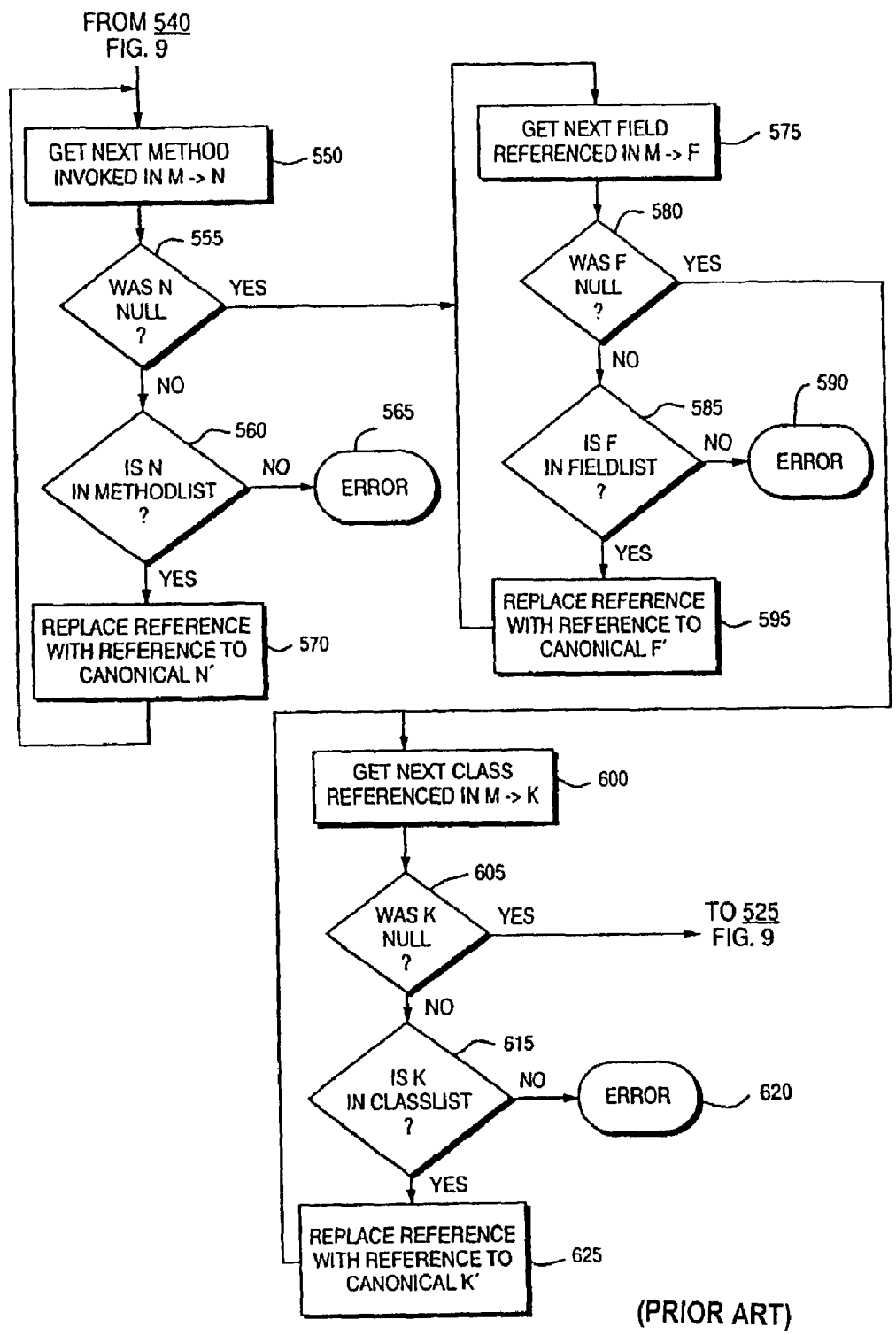
FIG. 10 is a flow diagram illustrating a second portion of a fifth phase of a method of concentrating software in accordance with the invention described in U.S. Pat. No. 6,163,780.

Exemplary removable media for storing the concentrating software 95 (which may be in any form, such as source code, compiled or binary versions) are illustrated in FIGS. 3A, 3B and 3C as floppy disks, magnetic tape and optical disks, respectively. In the preferred embodiment, the concentrating software 95 is read into RAM 65 when it is to be executed. To concentrate the upgrade bytecode 74, the concentrating software 95 is executed.

To provide a full understanding of the present invention, U.S. Pat. No. 6,163,780 is herein incorporated by reference. However, while the process described in that application is almost identical to the process that forms part of the present invention, in the present invention the resulting canonical lists (referred to herein as "OriginalClassList", "Original- MethodList" and "OriginalFieldList" respectively) contain a field for recording the unique identifier of the item the subject of the canonical list and a field for identifying whether the identifier has been upgraded (the "Upgrade Field"). To illustrate, each item in the OriginalClassList canonical list will record the name of a class and the fact that this item has not been upgraded. The process is shown schematically in FIGS. 4 to 10 with slight amendment.

Once the original bytecode 72 has been concentrated in the manner described in U.S. Pat. No. 6,163,780, an upgrade can then be made without the need for reconcentration of the original bytecode 72 by adopting the following process. The process comprises seven phases in total.

Figure 11:
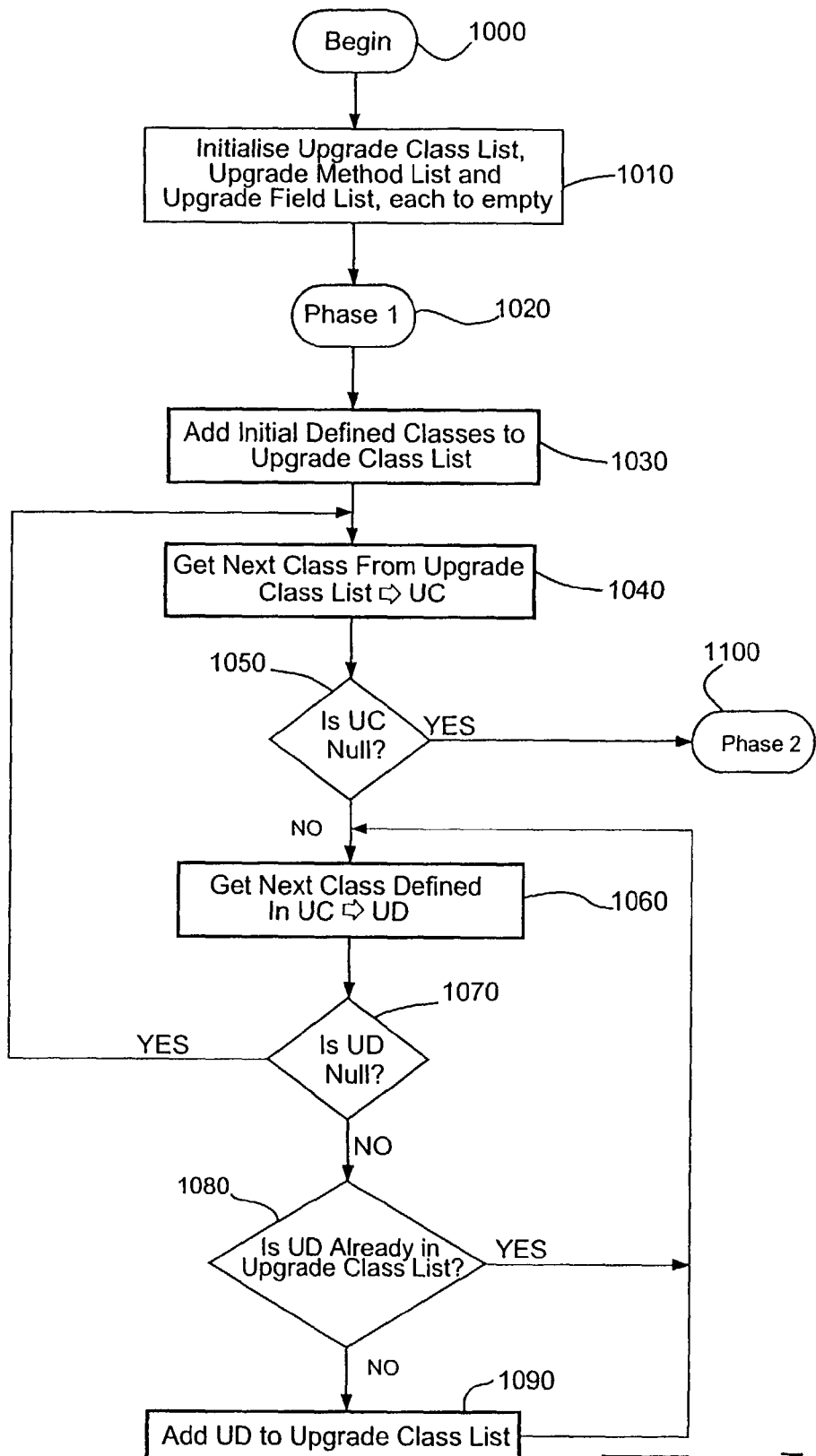
FIG. 11 is a flow diagram illustrating a first phase of a method of upgrading concentrated executable computer software code without reconcentration in accordance with the present invention.

As shown in FIG. 11, the upgrade process commences with an initialisation procedure 1000. The initialisation process 1000 consists of a single step 1010 where three lists corresponding respectively to classes, methods and fields are initialised to some default state, such as empty. The lists in the illustrated embodiment are referred to hereafter as "UpgradeClassList", "UpgradeMethodList" and "UpgradeFieldList". Note that the lists are used as exemplary data structures, but any suitable data structure may be used.

A pointer to the start of each list is then created and initialised. These pointers will be referred to hereafter as "ClassListStart", "MethodListStart" and "FieldListStart" as appropriate. At the same time, additional pointers to the end of each list are created and initialised. These pointers will be referred to hereafter as "ClassListEnd", "MethodListEnd" and "FieldListEnd" as appropriate.

The process then continues to Phase 1 as indicated by step 1020.

In Phase 1, 1020, the upgrade bytecode 74 is scanned and the UpgradeClassList populated. This commences with step 1030, when the upgrade bytecode 74 is scanned for any reserved words indicating that a new class has been defined. Such reserved words may vary according to the programming language of the upgrade bytecode 74. For example, in the JAVA programming language, the reserved word used to indicate that a new class has been defined is "class".

Any procedure for scanning the upgrade bytecode 74 may be used.

When a reserved word used to indicate that a new class has been defined is found, the scan continues until the name of the class defined is found. The name of the newly defined class is then inserted into the UpgradeClassList and ClassListEnd updated to point to the newly inserted class. In this manner, the UpgradeClassList ultimately generated preferably contains the names of each of the classes that are defined within the upgrade bytecode 74 and ClassListEnd points to the last class inserted into the UpgradeClassList.

At step 1040, a first class is retrieved from the UpgradeClassList and a variable UC is filled with the name corresponding to that first class. In successive iterations of step 1040, variable UC is assigned the name of successive classes listed in the UpgradeClassList and each class is processed in accordance with the steps that follow. Variable UC thereby indicates the class that is currently being processed, and such class is referred to herein as "Class UC".

Upon reaching the end of the UpgradeClassList, the variable UC is assigned an "end-of-list" value (e.g., a null value) indicating that there are no more classes in the UpgradeClassList to be processed. If it is determined, at step 1050, that variable UC has been assigned a null value, processing continues to the next phase, Phase 2, 1100. If UC has not been assigned a null value, thereby indicating that there are more classes to be processed, operation continues to step 1060.

At step 1060, Class UC is scanned to determine whether any other classes are defined therein. If so, the first of any such classes is assigned to a variable UD. If the scan of Class UC does not reveal any classes that are defined within Class UC, variable UD is assigned a null value.

In successive iterations of step 1060, variable UD is assigned the name of the next class defined within Class UC, if any. If Class UC does not reference any further classes defined within the upgrade bytecode, variable UD is assigned a null value.

Processing then continues at step 1070 where the value assigned to variable UD is analysed. If variable UD has been assigned a null value, processing returns to step 1040 where the next class identified in the UpgradeClassList is processed. If variable UD has been assigned any value other than a null value, processing moves to step 1080.

Step 1080 compares the value of variable UD, ie. the name of the class defined in the upgrade bytecode 74, against the names of classes already included in the UpgradeClassList. If this comparison determines that the class name, as recorded by variable UD, has already been included in the UpgradeClassList, processing returns to step 1060, where Class UC is scanned for further references to defined classes. If the comparison determines that the class name, as recorded by variable UD, has not already been included in the UpgradeClassList, processing continues to step 1090. At step 1090, the class name, as recorded by variable UD, is added to the UpgradeClassList at the position immediately after the class pointed to by ClassListEnd. ClassListEnd is then updated to point to the newly inserted class. Processing then returns to step 1060 to identify the next defined class, if any.

It is important, but not essential, that the upgrade bytecode 74 be scanned for classes defined therein, rather than merely for classes invoked within the upgrade bytecode 74. The reason for this is that aspects of the upgrade bytecode 74 may invoke classes that form part of the concentrated original bytecode 72. Thus, if the upgrade bytecode 74 were scanned for classes invoked within the upgrade bytecode 74, the resulting UpgradeClassList would be populated with classes that are defined in the concentrated original bytecode 72 as well as those defined in the upgrade bytecode 74. This would then require a supplementary procedure to eliminate the classes defined in the concentrated original bytecode 72 from the resulting UpgradeClassList, as such classes do not form part of the upgrade bytecode 74.

FIG. 12 Illustrates the steps involved in Phase 2, 1100. Phase 2, 1100 involves scanning the upgrade bytecode 74 and populating the UpgradeMethodList with initially identified methods. This phase commences with step 1110, where the upgrade bytecode 74 is scanned for any reserve words indicating that a new method has been defined. Such reserve words may vary according to the programming language of the upgrade bytecode 74. For example, in the JAVA programming language, the reserved word used to indicate that a new method has been defined is "method".

As described above, any series of processing steps to scan the upgrade bytecode 74 may be employed.

When a reserved word used to indicate that a new method has been defined is found, the scan continues until the name of the method defined is found. The name of the newly defined method is then inserted into the UpgradeMethodList at the position immediately after the method pointed to by MethodListEnd and MethodListEnd updated to point to the newly inserted method. In this manner, the UpgradeMethodList ultimately generated preferably contains the names of each of the methods that are defined within the upgrade bytecode 74.

Processing then continues at step 1120 where the UpgradeClassList is reset to its start, ie. the class pointed to by ClassListStart. The first class in the UpgradeClassList is then retrieved, at step 1130, and variable UC assigned the name corresponding to that first class.

In successive iterations of step 1130, variable UC is assigned the name of successive classes listed in the UpgradeClassList and each class is processed in accordance with the steps that follow. Variable UC thereby indicates the class that is currently being processed, and, as described above, such class is referred to as "Class UC".

Upon reaching the end of the UpgradeClassList, the variable UC is assigned an "end-of-list" value (e.g., a null value) indicating that there are no more classes in the UpgradeClassList to be processed. If it is determined, at step 1140, that variable UC has been assigned a null value, processing continues to Phase 3, 1190. If UC has not been assigned a null value, thereby indicating that there are more classes to be processed, operation continues to step 1150.

In step 1150, Class UC is scanned to determine the next reference to a defined method. The first of any such defined methods is assigned to a variable UM. If the scan of Class UC does not reveal any defined methods, or any further defined methods, variable UM is assigned a null value.

In successive iterations of step 1150, variable UM is assigned the name of the next method defined within Class UC. If Class UC does not define any further methods, variable UM is assigned a null value.

Processing then continues at step 1160 where the value of variable UM is analysed. If variable UM has been assigned a null value, processing returns to step 1130 where the next class identified in the UpgradeClassList is processed. If variable UM is assigned any value other than a null value, processing moves to step 1170.

Optionally, an additional step (not shown) may be included between steps 1160 and 1170, in which the location or other useful identifying characteristic of method UM is noted. In this step, pertinent information that is useful for later (post-concentration) processing, such as the "attributes" of the method, its location and size (i.e., the number of bytes in the bytecode which defines the method's operation), the exceptions the method might raise as error conditions, etc., can be optionally stored in an array, or can be stored in the UpgradeMethodList with the entry from the method UM.

Step 1170 compares the value of variable UM, i.e., the name of the method defined in Class UC, against the names of methods already included in the UpgradeMethodList. If this comparison determines that the method name, as recorded by variable UM, already has been included in the UpgradeMethodList, processing returns to step 1150, where Class UC is scanned for further method definitions. If the comparison determines that the method name, as recorded by variable UM, has not already been included in the UpgradeMethodList, processing continues to step 1180. At step 1180, the method name, as recorded by variable UM is added to the UpgradeMethodList at the position immediately after the method pointed to by MethodListEnd. MethodListEnd is then updated to point to the newly inserted method. Processing then returns to step 1150 to identify the next defined method, if any, in Class UC.

It is important, but not essential, that each class in the UpgradeClassList be scanned for methods defined therein, rather than merely for methods referenced within each class. The reason for this is that aspects of the upgrade bytecode 74 may reference methods that form part of the concentrated original bytecode 72. Thus, if each class in the UpgradeClassList were scanned for methods referenced therein, the resulting UpgradeMethodList would be populated with methods that are defined in the concentrated original bytecode 72 and in the upgrade bytecode 74. This would then require a supplementary procedure to eliminate the methods defined in the concentrated original bytecode 72 from the resulting UpgradeMethodList, as such methods do not form part of the upgrade bytecode 74.

Once all method definitions have been found, as indicated by variable UC having been assigned a null value when analysed at step 1160, processing continues to Phase 3, 1190 to facilitate population of the UpgradeFieldList.

Figure 13A:
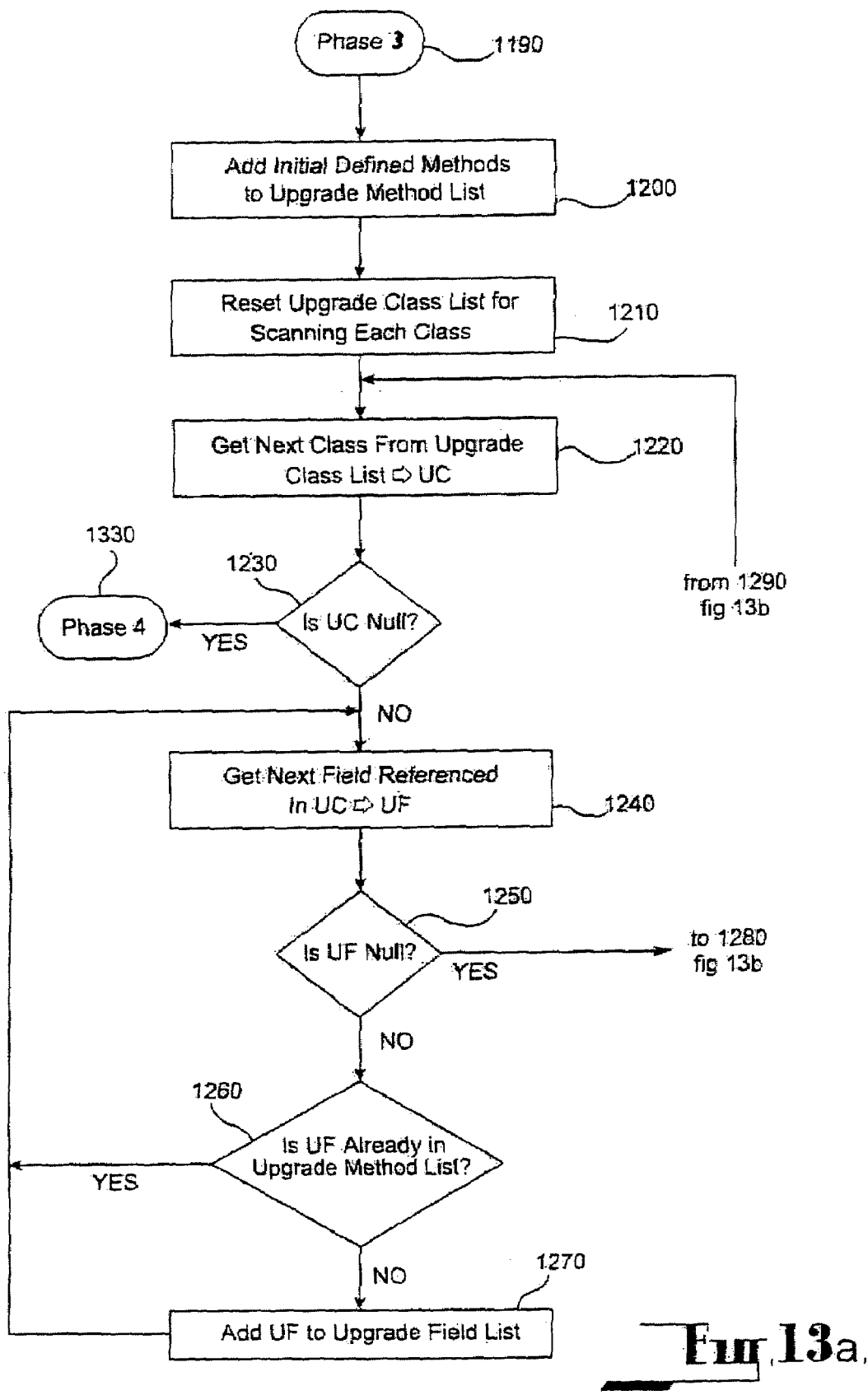
FIGS. 13a and 13b are flow diagrams illustrating a third phase of a method of upgrading concentrated executable computer software code without reconcentration in accordance with the present invention.
Figure 13B:
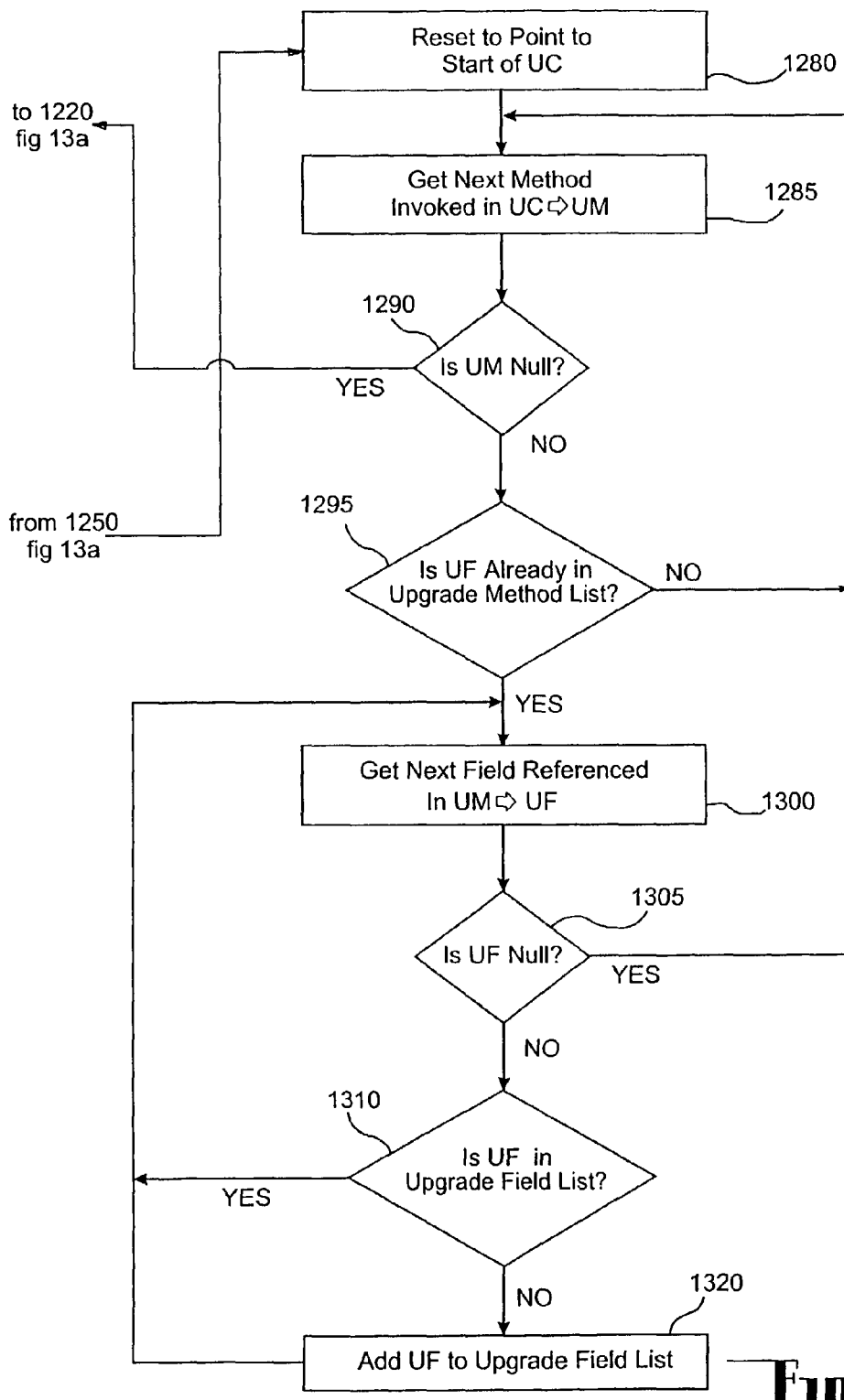

FIGS. 13*a* and 13*b* illustrate the steps involved in Phase 3, 1190. Phase 3, 1190 involves scanning the upgrade bytecode 74 and populating the UpgradeFieldList with initially identified fields (typically public fields). This phase commences with step 1200, where the upgrade bytecode 74 is scanned for any reserved words indicating that a new field has been defined. Such reserve words may vary according to the programming language of the upgrade bytecode 74.

As shown above, any series of processing steps to scan the upgrade bytecode 74 may be employed.

When a reserved word used to indicate that a new field has been defined is found, the scan continues until the name of the field defined is found. The name of the newly defined field is then inserted into the UpgradeFieldList at the position immediately after the field pointed to by FieldListEnd and FieldListEnd updated to point to the newly inserted field. In this manner, the UpgradeFieldList ultimately generated preferably contains the names of each of the fields that are defined within the upgrade bytecode 74. Processing then continues at step 1210.

At step 1210, UpgradeClassList is reset such that reference is made to the first class included therein, ie. to the class pointed to by ClassListStart. The first class in the UpgradeClassList is then retrieved, at step 1220, and the variable UC filled with the name corresponding to that first class.

In successive iterations of step 1220, variable UC is assigned the name of successive classes listed in the UpgradeClassList and each class is processed in accordance with the steps that follow. Variable UC thereby indicates the class that is currently being processed, and, as described above, such class will be referred to as "Class UC".

Upon reaching the end of the UpgradeClassList, the variable UC is assigned an "end-of-list" value (e.g., a null value) indicating that there are no more classes in the UpgradeClassList to be processed. If it is determined, at step 1230, that variable UC has been assigned a null value, processing continues to Phase 4, 1330. If UC has been assigned any value other than a null value, thereby indicating that there are more classes to be processed, operation continues to step 1240.

At step 1240, Class UC is scanned to determine the next field reference. The first of any such fields referenced is assigned to a variable UF. If the scan of Class UC does not reveal any field references, or any further field references, variable UF is assigned a null value.

In successive iterations of step 1240, variable UF is assigned the name of the next field referenced within Class UC. If Class UC does not refer to any further fields, variable UF is assigned a null value.

Processing then continues at step 1250 where the value of variable UF is analysed. If variable UF is assigned a null value, processing continues at step 1280. If variable UF is assigned any value other than a null value, processing moves to step 1260.

Optionally, an additional step (not shown) may be included between steps 1250 and 1260 in which the location or other identifying characteristic of the field UF is noted. In this step, attributes of the field such as the length, position (offset within an object), whether it is static or instance, and type of field can be stored for use in later processing. This information can be stored either in an ancillary and parallel array, or in the UpgradeFieldList along with the entry for the field UF.

Step 1260 compares the value assigned to variable UF, ie. the name of the referenced field, against the names of fields already included in the UpgradeFieldList. If this comparison determines that the field name, as recorded by variable UF, has already been included in the UpgradeFieldList, processing returns to step 1240, where Class UC is scanned for further field references. If the comparison determines that the field name, as recorded by variable UF, has not already been included in the UpgradeFieldList, processing continues to step 1270.

At step 1270, the field name, as recorded by variable UF is added to the UpgradeFieldList at the position immediately after the field pointed to by FieldListEnd. FieldListEnd is then updated to point to the newly inserted field. Processing then returns to step 1240 to identify the next field referenced, if any, in Class UC.

This process repeats until all fields referenced in Class UC have been identified.

At step 1280, Class UC is reset to its start. A scan is then commenced, at step 1285, of Class UC for any method invocations. When a method invocation is found, the name of the method invoked is assigned to variable UM. If Class UC does not include any method invocations, variable UM is assigned an "end-of-list" value, such as a null value.

In successive iterations of step 1285, variable UM is assigned the name of successive method invocations in Class UC and each method is processed in accordance with the steps that follow. Variable UM thereby indicates the method that is currently being processed, and such method will be referred to herein as "Method UM".

At step 1290, the value of variable UM is analysed to determine whether it has been assigned a null value. If variable UM has been assigned a null value, processing returns to step 1220 where the next class in the UpgradeClassList is processed. If variable UM has been assigned any value other than a null value, processing continues to step 1295.

Step 1295 compares the value assigned to variable UM, i.e., the name of the method invoked, against the names of methods already included in the UpgradeMethodList. If this comparison determines that the method name, as recorded by variable UM, has been included in the UpgradeMethodList, processing continues to step 1300. If the comparison determines that the method name, as recorded by variable UM, has not been included in the UpgradeMethodList, processing returns to step 1285 where the next method invoked in Class UC is processed.

The reason for further processing only those methods included in the UpgradeMethodList relates to the fact that fields referenced in methods not included in the UpgradeMethodList will have been processed as part of the OriginalFieldList.

At step 1300, method UM is scanned to determine the next field reference. The first of any such fields referenced is assigned to a variable UF. If the scan of Method UM does not reveal any field references, or any further field references, variable UF is assigned a null value.

In successive iterations of step 1300, variable UF is assigned the name of the next field referenced within Method UM. If Method UM does not refer to any further fields, variable UF is assigned a null value.

Processing then continues at step 1305 where the value of variable UF is analysed. If variable UF is assigned a null value, processing continues at step 1285 where the next method invoked in Class UC is identified. If variable UF is assigned any value other than a null value, processing moves to step 1310.

Step 1310 compares the value assigned to variable UF, i.e., the name of the referenced field, against the names of fields already included in the UpgradeFieldList. If this comparison determines that the field name, as recorded by variable UF, has already been included in the UpgradeFieldList, processing returns to step 1300, where Method UM is scanned for further field references. If the comparison determines that the field name, as recorded by variable UF, has not already been included in the UpgradeFieldList, processing continues to step 1320.

At step 1320, the field name, as recorded by variable UF is added to the UpgradeFieldList at the position immediately after the field pointed to by FieldListEnd. FieldListEnd is then updated to point to the newly inserted field. Processing then returns to step 1300 to identify the next field referenced, if any, in Method UM.

This process repeats until all methods invoked in Class UC have been traversed to identify any field references and all field references in each such method, i.e., Method UM, have been identified and processed.

Unlike the scans of the upgrade bytecode performed to populate the UpgradeClassList and the UpgradeMethodList, the scan of the upgrade bytecode performed to populate the UpgradeFieldList does not need to be limited to only defined fields. The reason for this is explained in more detail below.

It should be appreciated that while the scans to identify defined classes, defined methods and field references have been described separately herein, in implementation the processing involved in one or more such scans can be combined, i.e., a single scan can be made to identify all defined classes, defined methods and field references or a scan can be made to identify all defined methods and field references. Similarly, the process of filling the lists may be performed in any order and filling a particular list may be delayed until a later stage of processing when operation upon the data within that list is required.

Figure 14:
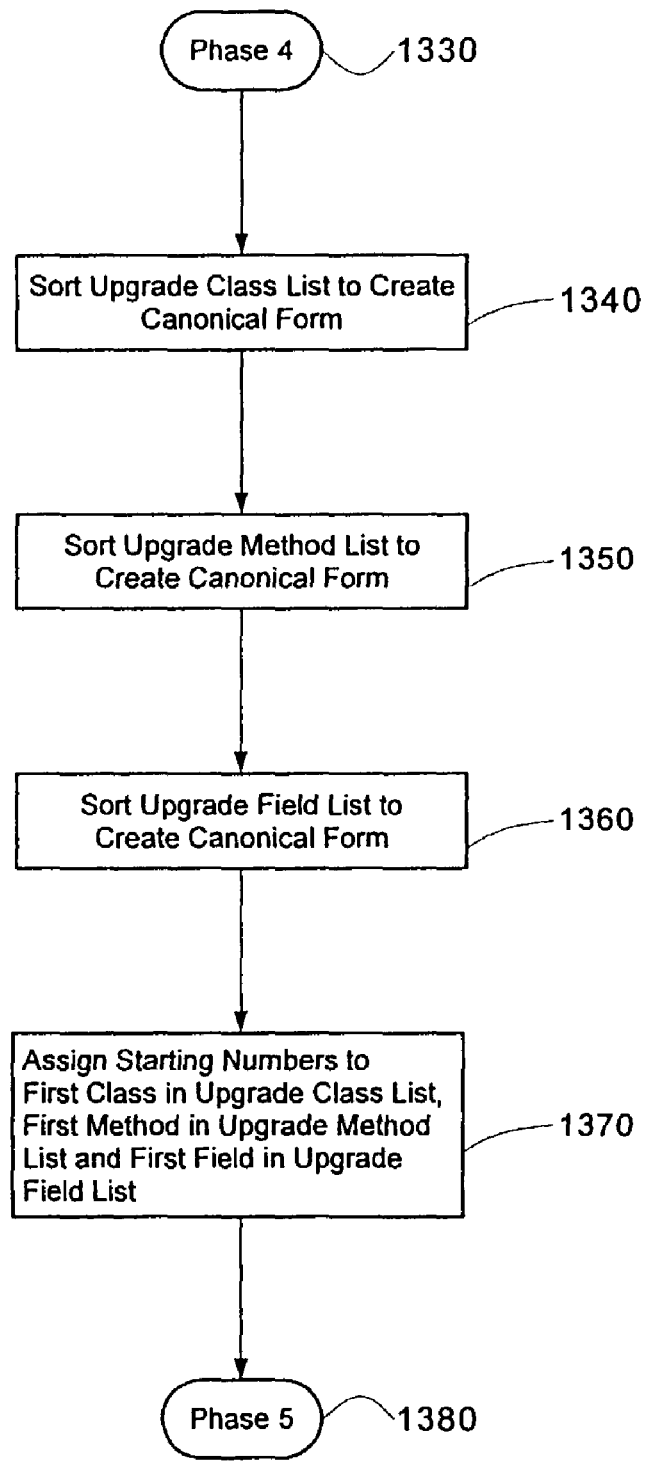
FIG. 14 is a flow diagram illustrating a fourth phase of a method of upgrading concentrated executable computer software code without reconcentration in accordance with the present invention.

FIG. 14 shows the steps that form Phase 4, 1330. Phase 4, commences by sorting the UpgradeClassList to create a canonical form, as illustrated by step 1340. Steps 1350 and 1360 are then processed to sort the UpgradeMethodList and UpgradeFieldList, respectively, to create canonical forms of each. Processing then proceeds to step 1370.

Step 1370 involves assigning a starting number or other unique identifier to the first entry in each of the respective canonical lists, ie. the first class in the UpgradeClassList, the first method in the UpgradeMethodList and the first field in the UpgradeFieldList (ie. those entries pointed to by ClassListStart, MethodListStart and FieldListStart respectively). This is an important step as the starting number or other unique identifier for each entry must exceed the number of entries in the Original form of the list, ie. the OriginalClassList, the OriginalMethodList and the OriginalFieldList. If this is not the case, then, when executing the inte.g.,rated bytecode 76 (i.e., the combination of the concentrated upgrade bytecode 74 and the concentrated original bytecode 72), it may not be possible to determine whether, for example, a reference is to the nth element in the Original-ClassList or to the nth element in the UpgradeClassList.

One solution to this problem is to designate the starting number for each entry in, respectively, the UpgradeClassList, UpgradeMethodList and UpgradeFieldList with a new series of numbers. To elaborate, if the OriginalClassList, OriginalMethodList and OriginalFieldList each had less than 100 entries therein, the starting number for each entry in the UpgradeClassList, UpgradeMethodList and UpgradeFieldList can be 100.

It should be noted that the index need not be a number and, where this is the case, an appropriate alternative starting value should be allocated to the first entry in, respectively, the UpgradeClassList, UpgradeMethodList and UpgradeFieldList. For example, if the canonical lists formed in respect of the original bytecode 72 use numbers as index references, the canonical lists formed in respect of the upgrade bytecode 74 can use strings of characters as the index reference, and in this manner further distinguish between the upgrade bytecode 74 and the original bytecode 72.

Figure 15:
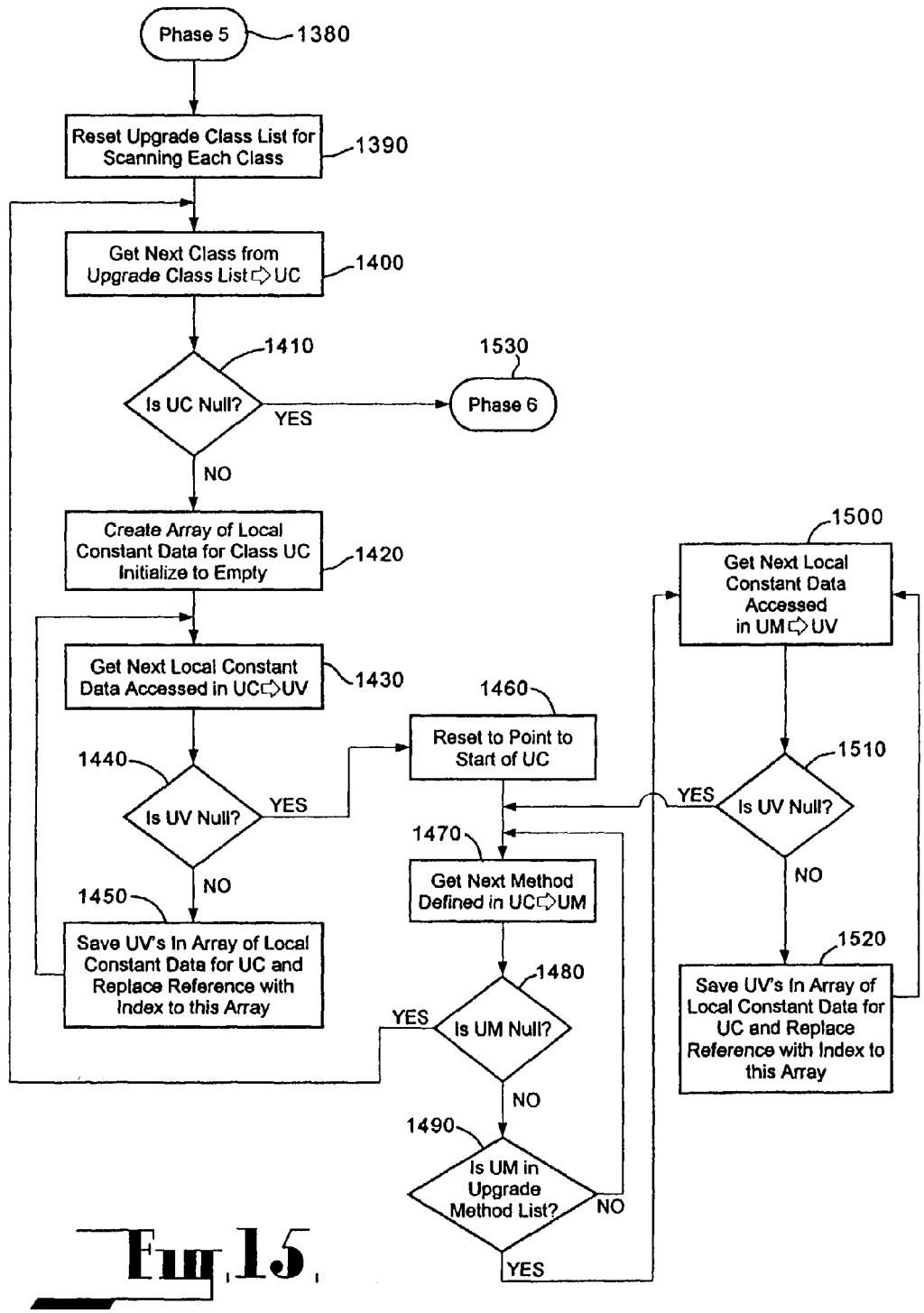
FIG. 15 is a flow diagram illustrating a fifth phase of a method of upgrading concentrated executable computer software code without reconcentration in accordance with the present invention.

Upon completion of step 1370, processing continues to Phase 5, 1380 (see FIG. 15).

Phase 5, 1380 commences, at step 1390, by resetting the UpgradeClassList such that reference is made to the first class included therein, i.e., to the class pointed to by ClassListStart. The first class in the UpgradeClassList is then retrieved, at step 1400, and the variable UC filled with the name corresponding to that first class.

In successive iterations of step 1400, variable UC is assigned the name of successive classes listed in the UpgradeClassList and each class is processed in accordance with the steps that follow. Variable UC thereby indicates the class that is currently being processed, and, as above, such class will be referred to as "Class UC".

Upon reaching the end of the UpgradeClassList, the variable UC is assigned an "end-of-list" value (e.g., a null value) indicating that there are no more classes in the UpgradeClassList to be processed. If it is determined, at step 1410, that variable UC has been assigned a null value, processing continues to Phase 6, 1530. If UC has been assigned any value other than a null value, thereby indicating that there are more classes to be processed, operation continues to step 1420.

Step 1420 comprises two actions. Firstly, an array of local constant data for Class UC is created. Secondly, the array is initialised to some default state such as empty. Subsequent iterations of step 1420 see a new array of local constant data being created and initialised, each new array being associated with the class then being processed, i.e., Class UC.

Processing then continues to step 1430. At step 1430, Class UC is scanned for a reference to a local constant data. When, and if, so found the name of the local constant data so referenced is assigned to variable UV. If Class UC contains no references to local constant data, variable UV is assigned a null value.

In successive iterations of step 1430, variable UV is assigned the name of the next local constant data referenced within Class UC. If Class UC does not refer to any further local constant data, variable UV is assigned a null value.

Step 1440 involves the analysis of the value assigned to variable UV. If variable UV has been assigned a null value processing continues at step 1460. If variable UV has been assigned any value other than a null value, processing continues to step 1450.

At step 1450, the value assigned to variable UV is saved in the array of local constant data created at step 1420. The reference in Class UC to the local constant data is then replaced with the value representing the position in the array of local constant data where the value assigned to variable UV has been saved. Processing then returns to step 1430.

Once all local constant data references in Class UC have been identified and saved in the array of local constant data, processing moves to step 1460.

At step 1460, Class UC is reset to its start. A scan is then commenced, at step 1470, of Class UC for any method invocations. When a method invocation is found, the name of the method invoked is assigned to variable UM. If Class UC does not include any method invocations, variable UM is assigned an "end-of-list" value, such as a null value.

In successive iterations of step 1470, variable UM is assigned the name of successive method invocations in Class UC and each method is processed in accordance with the steps that follow. Variable UM thereby indicates the method that is currently being processed, and, as above, such method will be referred to as "Method UM".

At step 1480, the value of variable UM is analysed to determine whether it has been assigned a null value. If variable UM has been assigned a null value, processing returns to step 1400 where the next class in the UpgradeClassList is processed. If variable UM has been assigned any value other than a null value, processing continues to step 1490.

Step 1490 compares the value assigned to variable UM, i.e., the name of the method invoked, against the names of methods already included in the UpgradeMethodList. If this comparison determines that the method name, as recorded by variable UM, has been included in the UpgradeMethodList, processing continues to step 1500. If the comparison determines that the method name, as recorded by variable UM, has not been included in the UpgradeMethodList, processing returns to step 1470 where the next method invoked in Class UC is processed.

The reason for further processing only those methods included in the UpgradeMethodList relates to the fact that local constant data referenced in methods not included in the UpgradeMethodList will have been processed as part of the concentration process of the original bytecode.

At step 1500, method UM is scanned to determine the next local constant data reference. The first of any such references is assigned to a variable Uv. If the scan of Method UM does not reveal any local constant data references, or any further local constant data references, variable UV is assigned a null value.

In successive iterations of step 1500, variable UV is assigned the name of the next local constant data referenced within Method UM. If Method UM does not refer to any further local constant data, variable UV is assigned a null value.

Processing then continues at step 1510 where the value of variable UV is analysed. If variable UV is assigned a null value, processing returns to step 1470 where the next method invoked in Class UC is identified. If variable UV is assigned any value other than a null value, processing moves to step 1520.

At step 1520, the value assigned to variable UV is saved in the array of local constant data created at step 1420. The reference in Class UC to the local constant data is then replaced with the value representing the position in the array of local constant data where the value assigned to variable UV has been saved. Processing then returns to step 1500.

This process repeats until all methods invoked in Class UC have been traversed to identify any local constant data references and all local constant data references in each such method, ie. Method UM, have been identified and saved in the array of local constant data for Class UC.

Figure 16:
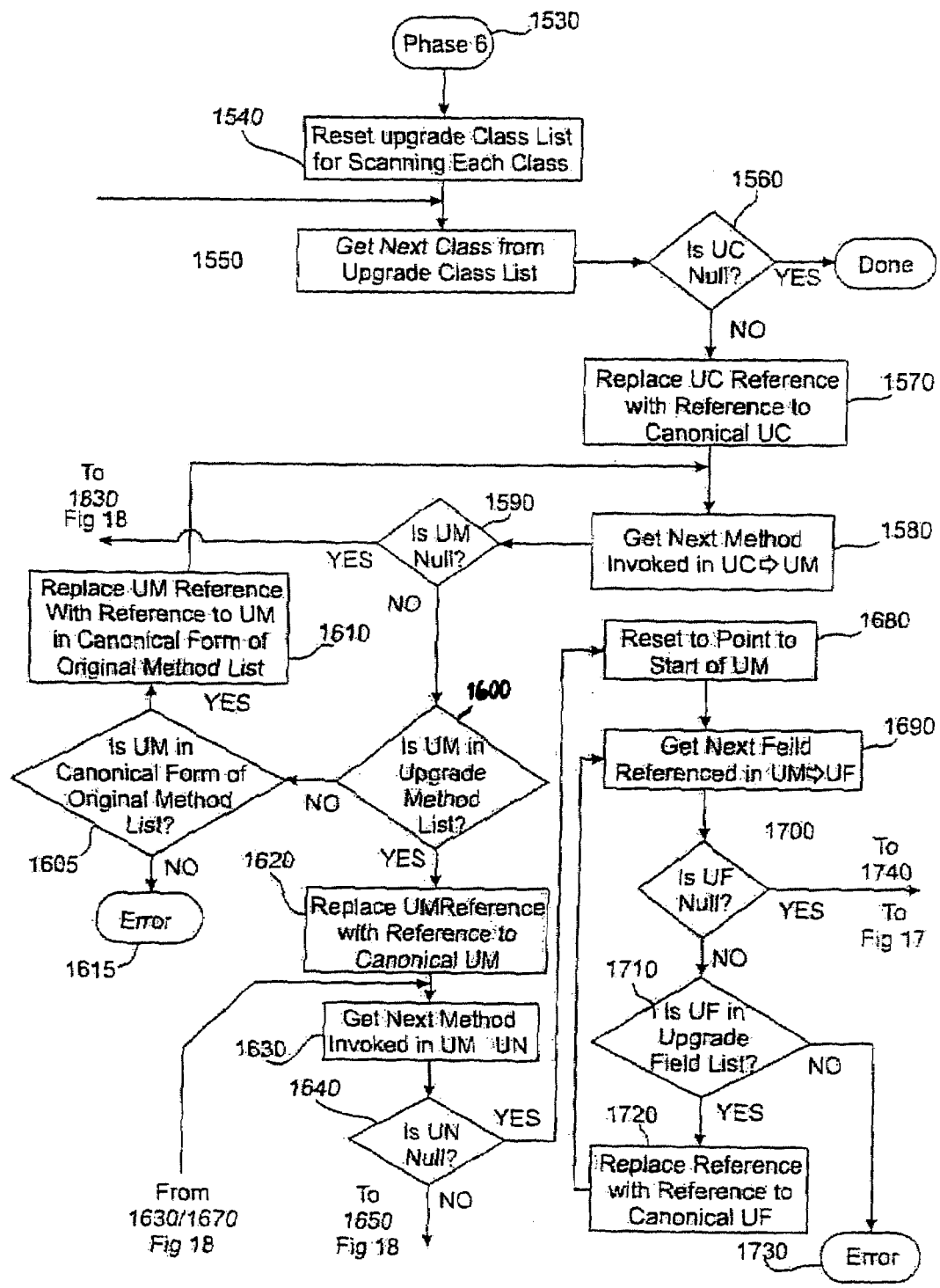
FIG. 16 is a flow diagram illustrating a first portion of a sixth phase of a method of upgrading concentrated executable computer software code without reconcentration in accordance with the present invention.
Figure 17:
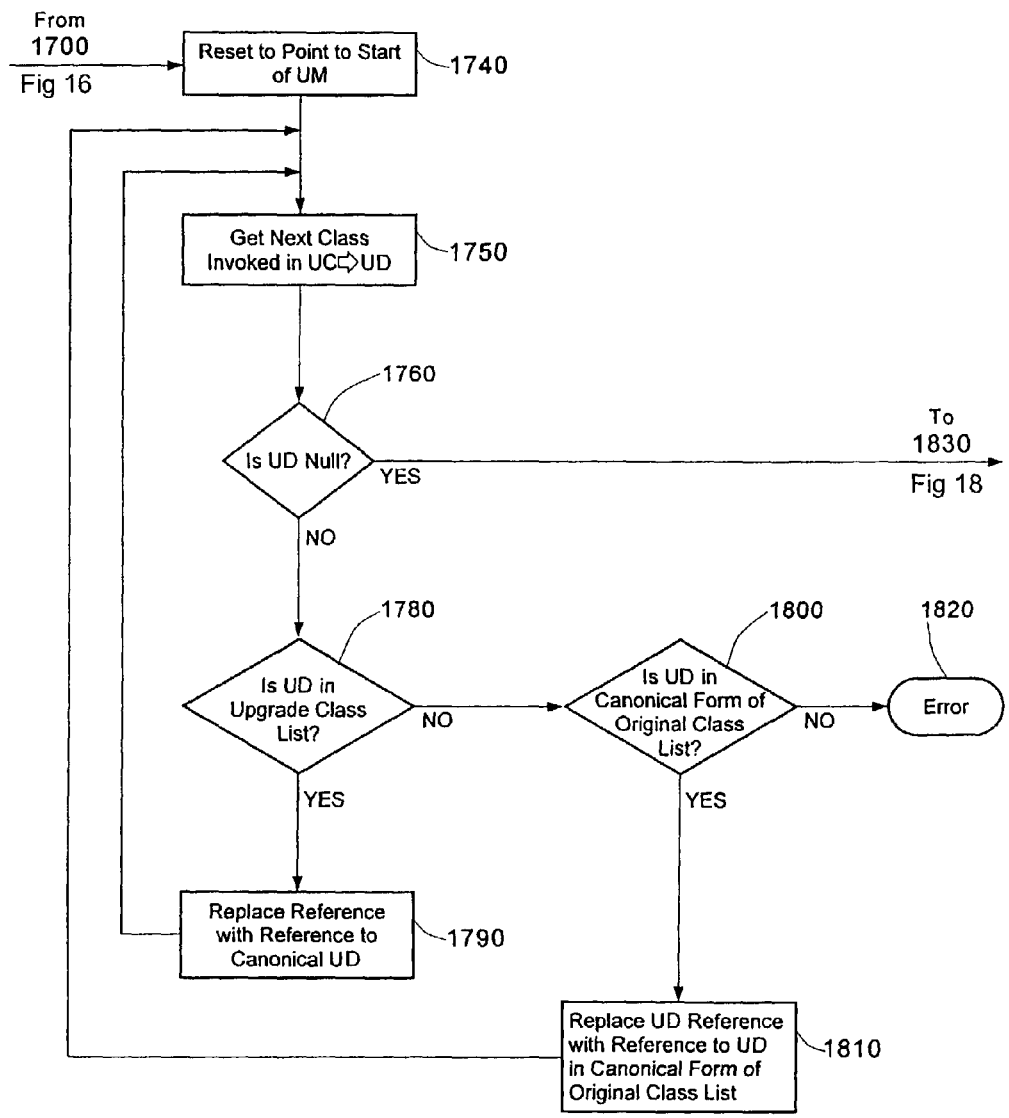
FIG. 17 is a flow diagram illustrating a second portion of a sixth phase of a method of upgrading concentrated executable computer software code without reconcentration in accordance with the present invention.
Figure 18:
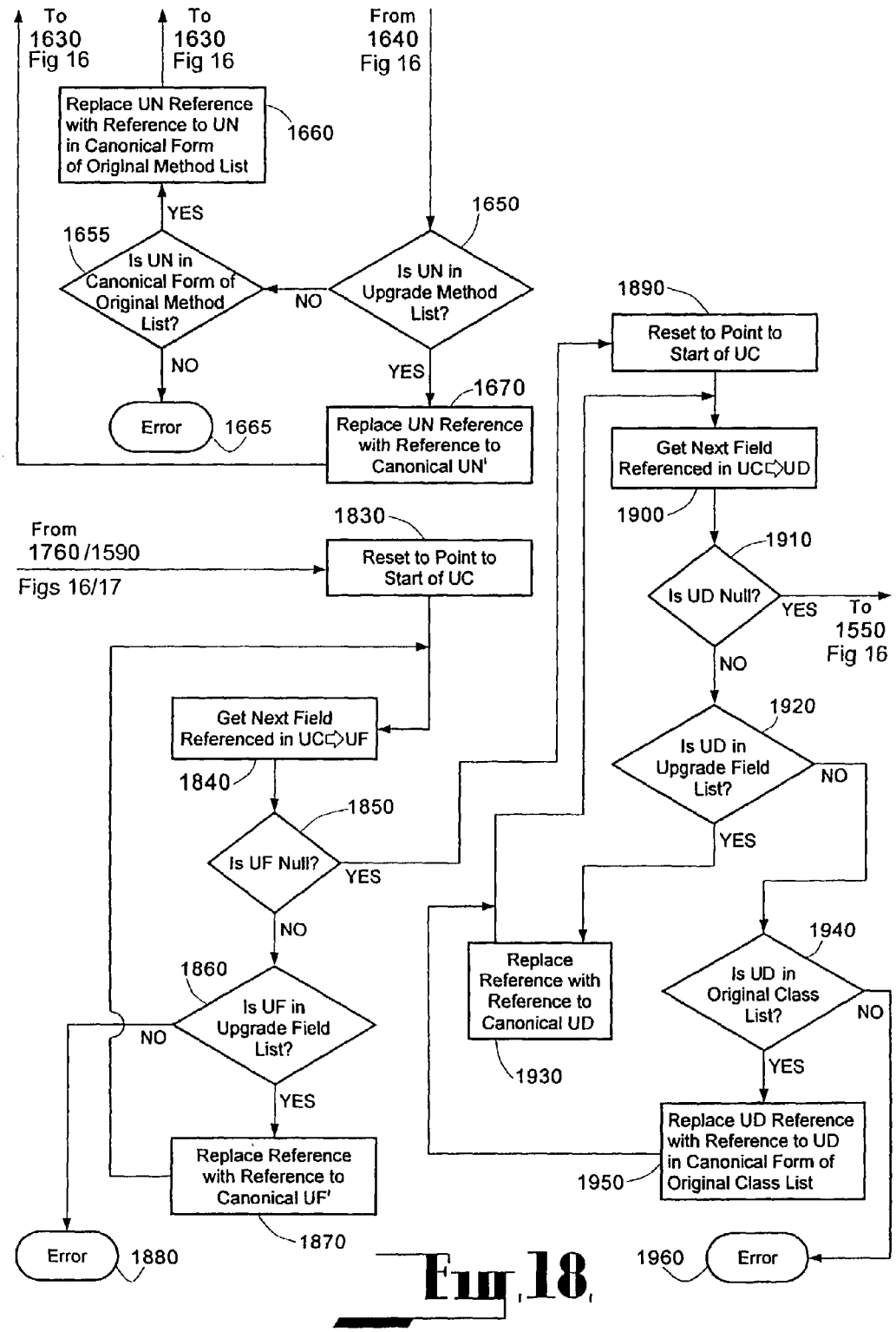
FIG. 18 is a flow diagram illustrating a third portion of a sixth phase of a method of upgrading concentrated executable computer software code without reconcentration in accordance with the present invention.

Phase 6, 1530, sees the classes, methods and fields referenced in the upgrade bytecode 74 replaced with a reference to the appropriate entry in the appropriate canonical list. The phase commences with step 1540 and is illustrated in FIGS. 16 to 18.

At step 1540, UpgradeClassList is reset such that reference is made to the first class included therein, i.e., to the class pointed to by ClassListStart. The first class in the UpgradeClassList is then retrieved, at step 1550, and the variable UC filled with the name corresponding to that first class.

In successive iterations of step 1550, variable UC is assigned the name of successive classes listed in the UpgradeClassList and each class is processed in accordance with the steps that follow. Variable UC thereby indicates the class that is currently being processed, and, as above, such class will be referred to as "Class UC".

Upon reaching the end of the UpgradeClassList, the variable UC is assigned an "end-of-list" value (e.g., a null value) indicating that there are no more classes in the UpgradeClassList to be processed. If it is determined, at step 1560, that variable UC has been assigned a null value, concentration of the upgrade bytecode 74 is complete and processing proceeds to Phase 7, 1965, to inte.g.,rate the concentrated upgrade bytecode 74 with the concentrated original bytecode 72. If UC has been assigned any value other than a null value, thereby indicating that there are more classes to be processed, operation continues to step 1570.

At step 1570 the reference to the class name is replaced with the index value of the corresponding class name in UpgradeClassList. For example, if the class name corresponded with the fifth entry in the UpgradeClassList, and the starting number for the first class in the UpgradeClassList was 100, then the reference to the class name would be replaced by the number 104.

Processing then continues at step 1580 where Class UC is scanned for method invocations. When a method invocation is found, the name of the method invoked is assigned to variable UM. If Class UC does not include any method invocations, variable UM is assigned an "end-of-list" value, such as a null value.

In successive iterations of step 1580, variable UM is assigned the name of successive method invocations in Class UC and each method is processed in accordance with the steps that follow. Variable UM thereby indicates the method that is currently being processed, and, as above, such method will be referred to as "Method UM".

At step 1590 the value assigned to variable UM is analysed. If variable UM has been assigned a null value processing continues to step 1830. If variable UM has been assigned any value other than a null value, processing continues to step 1600.

Step 1600 compares the value assigned to variable UM, i.e., the name of the method invoked, against the names of methods already included in the UpgradeMethodList. If this comparison determines that the method name, as recorded by variable UM, has been included in the UpgradeMethodList, processing continues to step 1620. If the comparison determines that the method name, as recorded by variable UM, has not been included in the UpgradeMethodList, processing continues to step 1605.

Step 1605 compares the value assigned to variable UM, i.e., the name of the method invoked, against the names of methods included in the OriginalMethodList. If this comparison determines that the method name, as recorded by variable UM, is included in the OriginalMethodList, processing continues to step 1610. If the comparison determines that the method name, as recorded by variable UM, is not included in the OriginalMethodList, an error is raised and appropriate error-handling procedures invoked at step 1615.

At step 1610 the reference to the method name is replaced with the index value of the corresponding method name in the OriginalMethodList. For example, if the method name coincided with the fifth entry in the OriginalMethodList, then the reference to the method name would be replaced by the number 5. Processing then returns to step 1580.

At step 1620 the reference to the method name is replaced with the index value of the corresponding method name in the UpgradeMethodList. For example, if the method name coincided with the fifth entry in the UpgradeMethodList, and the starting number for the first method in the UpgradeMethodList was 100, then the reference to the method name would be replaced by the number 104.

Processing then continues to step 1630 where the first method invoked in Method UM is retrieved and the variable UN filled with the name corresponding to that first method. In successive iterations of step 1630, variable UN is assigned the name of successive methods invoked in Method UM and each method is processed in accordance with the steps that follow.

When no further method invocations are identified in Method UM, the variable UN is assigned an "end-of-list" value (e.g., a null value) indicating that there are no more classes in the UpgradeClassList to be processed. If it is determined, at step 1640, that variable UN has been assigned a null value, processing continues to step 1680. If UN has been assigned any value other than a null value, thereby indicating that there are more method invocations to be processed, operation continues to step 1650.

Step 1650 compares the value assigned to variable UN, i.e., the name of the method invoked, against the names of methods already included in the UpgradeMethodList. If this comparison determines that the method name, as recorded by variable UN, has been included in the UpgradeMethodList, processing continues to step 1670. If the comparison determines that the method name, as recorded by variable UN, has not been included in the UpgradeMethodList, processing continues to step 1655.

Step 1655 compares the value assigned to variable UN, ie. the name of the method invoked, against the names of methods included in the OriginalMethodList. If this comparison determines that the method name, as recorded by variable UN, is included in the OriginalMethodList, processing continues to step 1660. If the comparison determines that the method name, as recorded by variable UN, is not included in the OriginaRMethodList, an error is raised and appropriate error-handling procedures invoked at step 1665.

At step 1660 the reference to the method name is replaced with the index value of the corresponding method name in the OriginalMethodList. Processing then returns to step 1630.

At step 1670 the reference to the method name is replaced with the index value of the corresponding method name in the UpgradeMethodList. Thereafter, as for step 1660, processing returns to step 1630.

At step 1680, Method UM is reset to its start. A scan is then commenced, at step 1690, of Method UM for any field references. When a field reference is found, the name of the field referenced is assigned to variable UF. If Method UM does not include any field references, variable UF is assigned an "end-of-list" value, such as a null value.

In successive iterations of step 1690, variable UF is assigned the name of successive field references in Method UM and each field reference is processed in accordance with the steps that follow.

At step 1700, the value of variable UF is analysed to determine whether it has been assigned a null value. If variable UF has been assigned a null value, processing proceeds to step 1740. If variable UF has been assigned any value other than a null value, processing continues to step 1710.

Step 1710 compares the value assigned to variable UF, i.e., the name of the field referenced, against the names of fields already included in the UpgradeFieldList. If this comparison determines that the field name, as recorded by variable UF, has been included in the UpgradeFieldList, processing continues to step 1720. If the comparison determines that the field name, as recorded by variable UF, has not been included in the UpgradeFieldList an error is raised and appropriate error-handling procedures invoked at step 1730.

At step 1720, the reference to the field name is replaced with the index value of the corresponding method name in the UpgradeFieldList. Processing then returns to step 1690.

Step 1740 involves resetting Method UM to its start. A scan is then commenced, at step 1750, of Method UM for any class invocations. When a class invocation is found, the name of the class invoked is assigned to variable UD. If Method UM does not include any class invocations, variable UD is assigned an "end-of-list" value, such as a null value.

In successive iterations of step 1750, variable UD is assigned the name of successive class invocations in Method UM and each class invocation is processed in accordance with the steps that follow.

At step 1760, the value of variable UD is analysed to determine whether it has been assigned a null value. If variable UD has been assigned a null value, processing proceeds to step 1830. If variable UD has been assigned any value other than a null value, processing continues to step 1780.

Step 1780 compares the value assigned to variable UD, i.e., the name of the class invoked, against the names of classes already included in the UpgradeClassList. If this comparison determines that the class name, as recorded by variable UD, is included in the UpgradeClassList, processing continues to step 1790. If the comparison determines that the class name, as recorded by variable UD, is not included in the UpgradeClassList, processing continues at step 1800.

At step 1790, the reference to the class name is replaced with the index value of the corresponding class name in the UpgradeClassList. Processing then returns to step 1750.

Step 1800 compares the value assigned to variable UD, i.e., the name of the class invoked, against the names of classes included in the OriginalClassList. If this comparison determines that the class name, as recorded by variable LTD, is included in the OriginalClassList, processing continues to step 1810. If the comparison determines that the class name, as recorded by variable UD, is not included in the OriginalClassList, an error is raised and appropriate error-handling procedures invoked at step 1820.

At step 1810 the reference to the class name is replaced with the index value of the corresponding class name in the OriginalClassList. Thereafter, as for step 1790, processing returns to step 1750.

Step 1830 involves resetting Class UC to its start. A scan is then commenced, at step 1840, of Class UC for any field references. When a field reference is found, the name of the field referenced is assigned to variable UF. If Class UC does not include any field references, variable UF is assigned an "end-of-list" value, such as a null value.

In successive iterations of step 1840, variable UF is assigned the name of successive fields referenced in Class UC and each field reference is processed in accordance with the steps that follow.

At step 1850, the value of variable UF is analysed to determine whether it has been assigned a null value. If variable UD has been assigned a null value, processing proceeds to step 1890. If variable UD has been assigned any value other than a null value, processing continues to step 1860.

Step 1860 compares the value assigned to variable UF, i.e., the name of the field referenced, against the names of fields already included in the UpgradeFieldList. If this comparison determines that the field name, as recorded by variable UF, is included in the UpgradeFieldList, processing continues to step 1870. If the comparison determines that the field name, as recorded by variable UF, is not included in the UpgradeFieldList, an error is raised and appropriate error-handling procedures invoked at step 1880.

At step 1870, the reference to the field name is replaced with the index value of the corresponding field name in the UpgradeFieldList. Processing then returns to step 1840.

Step 1890 involves resetting Class UC to its start. A scan is then commenced, at step 1900, of Class UC for any class invocations. When a class invocation is found, the name of the class invoked is assigned to variable UD. If Class UC does not include any class invocations, variable UD is assigned an "end-of-list" value, such as a null value.

In successive iterations of step 1900, variable UD is assigned the name of successive classes invocations in Class UC and each class invocation is processed in accordance with the steps that follow.

At step 1910, the value of variable ULD is analysed to determine whether it has been assigned a null value. If variable UD has been assigned a null value, processing returns to step 1550 where the next class in the UpgradeClassList is processed. If variable UD has been assigned any value other than a null value, processing continues to step 1920.

Step 1920 compares the value assigned to variable UD, i.e., the name of the class invoked, against the names of classes already included in the UpgradeClassList. If this comparison determines that the class name, as recorded by variable UD, is included in the UpgradeClassList, processing continues to step 1930. If the comparison determines that the class name, as recorded by variable UD, is not included in the UpgradeClassList, processing continues at step 1940.

At step 1930, the reference to the class name is replaced with the index value of the corresponding class name in the UpgradeClassList. Processing then returns to step 1900.

Step 1940 compares the value assigned to variable UD, ie. the name of the class invoked, against the names of classes included in the OriginalClassList. If this comparison determines that the class name, as recorded by variable UD, is included in the OriginalClassList, processing continues to step 1950. If the comparison determines that the class name, as recorded by variable UD, is not included in the OriginalClassList, an error is raised and appropriate error-handling procedures invoked at step 1960.

At step 1950 the reference to the class name is replaced with the index value of the corresponding class name in the OriginalClassList. Thereafter, as for step 1930, processing returns to step 1900.

It should be noted that when replacing a class or method reference it is necessary to check that the reference is included in the Upgrade version of the canonical list before initiating any check to determine whether the reference is included in the Original version of the canonical list. The reason for this is that if, for example, a class included in the OriginalClassList was upgraded in the UpgradeClassList and the processing referred to above was reversed, the upgrade bytecode 74 would have the class reference replaced with the reference to the class in the OriginalClassList. Additional processing would then be required to analyse the Upgrade Field and use the value assigned to the Upgrade Field to reference the upgraded class.

It is for a similar reason that the class and method scans that form the basis for Phase 1, 1020, and Phase 2, 1100, preferably are for defined classes/methods rather than invoked classes/methods. To illustrate with reference to Phase 1, 1020, if the scan was for all classes invoked in the upgrade bytecode 74 the resulting UpgradeClassList is likely to include classes that form part of the original bytecode 72 as well as the upgrade bytecode 74. If these redundant classes (i.e., the classes the form part of the original bytecode 72 and not part of the upgrade bytecode 74) were to remain in the UpgradeClassList, the results would be twofold:

firstly, the concentration process would be slowed due to the need to traverse the additional classes included in the UpgradeClassList; and secondly, and more importantly, when replacing the class invocations during Phase 6, 1530, invocations of classes that form part of the original bytecode 72 would be replaced with the index reference to the class in the UpgradeClassList. This would then result in the processing thread being lost as there would be no association between the index reference and the actual bytecode that constitutes the class.

It is possible, in alternative embodiments, to solve this second problem by introducing a further step of creating a cross-referencing link prior to commencement of Phase 6, 1530, i.e., change the UpgradeField of the duplicate entry in the UpgradeClassList to refer to the index reference of the same class in the OriginalClassList. However, this creates its own problems in that classes upgraded as part of the UpgradeClassList will be lost as part of this cross-referencing process.

Figure 19:
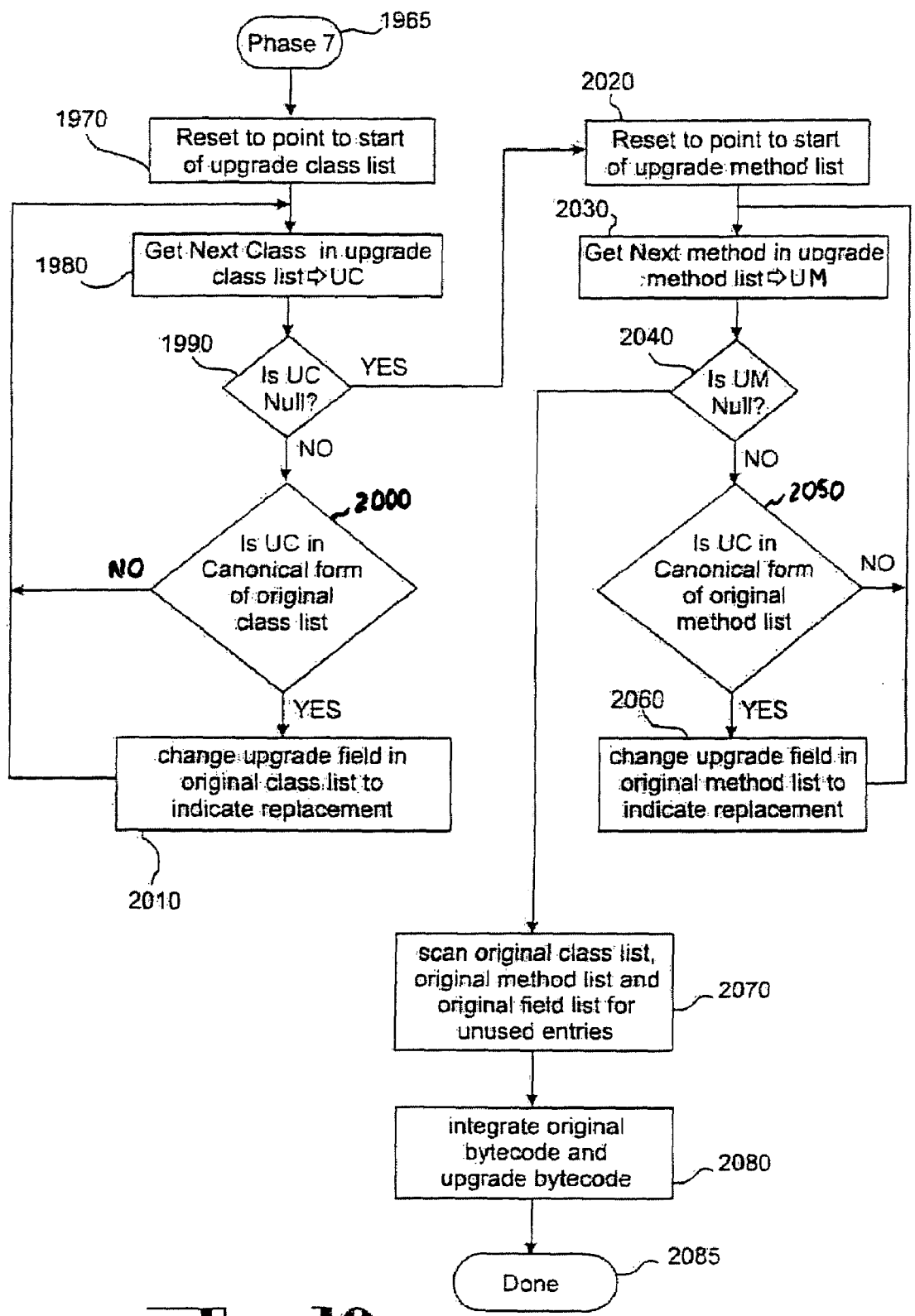
FIG. 19 is a flow diagram illustrating a seventh phase of a method of upgrading concentrated executable computer software code without reconcentration in accordance with the present invention.

Processing then continues to Phase 7, 1965 as illustrated in FIG. 19.

Phase 7, 1965 commences with step 1970. At step 1970, UpgradeClassList is reset such that reference is made to the first class included therein, i.e., to the class pointed to by ClassListStart. The first class in the UpgradeClassList is then retrieved, at step 1980, and the variable UC filled with the name corresponding to that first class.

In successive iterations of step 1980, variable UC is assigned the name of successive classes listed in the UpgradeClassList and each class is processed in accordance with the steps that follow. Variable UC thereby indicates the class that is currently being processed, and, as above, such class will be referred to as "Class UC".

Upon reaching the end of the UpgradeClassList, the variable UC is assigned an "end-of-list" value (e.g., a null value) indicating that there are no more classes in the UpgradeClassList to be processed. If it is determined, at step 1990, that variable UC has been assigned a null value, processing proceeds to step 2020. If UC has been assigned any value other than a null value, thereby indicating that there are more classes to be processed, operation continues to step 2000.

Step 2000 compares the value assigned to variable UC, i.e., the name of the class invoked, against the names of classes included in the OriginalClassList. If this comparison determines that the class name, as recorded by variable UC, is included in the OriginalClassList, processing continues to step 2010. If the comparison determines that the class name, as recorded by variable UC, is not included in the OriginalClassList, processing continues at step 1980.

At step 2010 the Upgrade Field of the entry in the OriginalClassList corresponding to the class represented by Class UC is changed to indicate that that class has been upgraded. Processing then returns to step 1980.

At step 2020, UpgradeMethodList is reset such that reference is made to the first method included therein, i.e., to the method pointed to by MethodListStart. The first method in the MethodClassList is then retrieved, at step 2030, and the variable UM filled with the name corresponding to that first method.

In successive iterations of step 2030, variable UM is assigned the name of successive methods listed in the UpgradeMethodList and each method is processed in accordance with the steps that follow. Variable UM thereby indicates the method that is currently being processed, and, as above, such method will be referred to as "Method UM".

Upon reaching the end of the UpgradeMethodtList the variable UM is assigned an "end-of-list" value (e.g., a null value) indicating that there are no more methods in the UpgradeMethodList to be processed. If it is determined, at step 2040, that variable UM has been assigned a null value, processing proceeds to step 2070. If UM has been assigned any value other than a null value, thereby indicating that there are more methods to be processed, operation continues to step 2050.

Step 2050 compares the value assigned to variable UM, ie. the name of the method invoked, against the names of methods included in the OriginalMethodList. If this comparison determines that the method name, as recorded by variable UM, is included in the OriginalMethodList, processing continues to step 2060. If the comparison determines that the method name, as recorded by variable UM, is not included in the OriginalMethodList, processing continues at step 2030.

At step 2060 the Upgrade Field of the entry in the OriginalMethodList corresponding to the method represented by Class UM is changed to indicate that that method has been upgraded. Processing then returns to step 2030.

Step 2070 is an optional optimisation step in which the original bytecode 72 is scanned for uncalled or unused classes, methods and/or fields. When such classes, methods and/or fields are found, they are recorded as unused or unnecessary by changing the value of their associated Upgrade Field to represent deleted status. When step 2070 has been completed, processing continues to step 2080.

At step 2080 the concentrated original bytecode 72 and the concentrated original bytecode 74 are integrated. Typically, this may be achieved with the assistance of APIs. The resulting bytecode shall be referred to hereafter as the "integrated bytecode" 76.

The replacement process is then completed, as illustrated by step 2085.

It should be noted that the steps that form Phase 7, 1965, are typically performed at the location of the data processing system 40 containing the original bytecode 72. Accordingly, it is to be expected that the upgrade bytecode will be transferred to such data processing system 40, via the ECN 70, prior to commencement of Phase 7, 1965.

Figure 20:
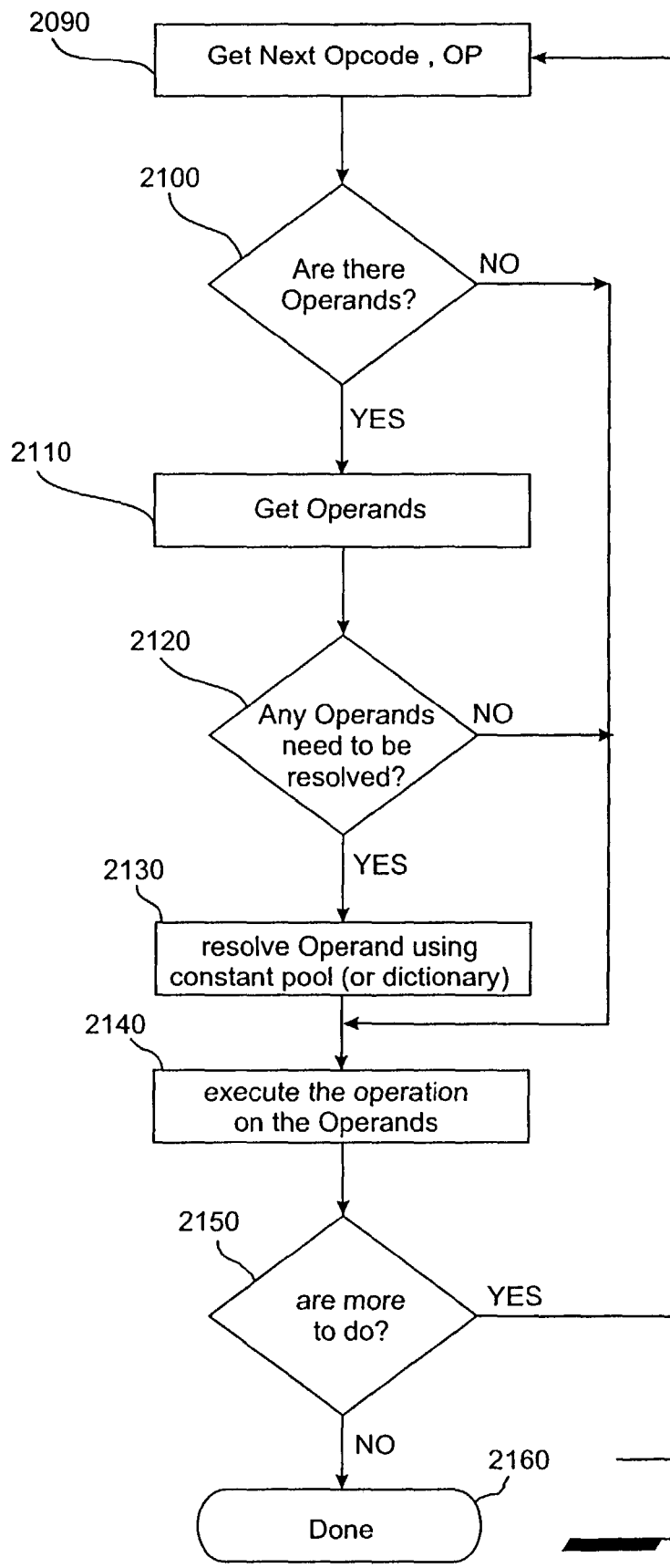
FIG. 20 is a flow diagram of an exemplary method of executing the combination of upgrade bytecode concentrated in accordance with the present invention and original bytecode concentrated in accordance with the invention the subject of U.S. Pat. No. 6,163,780.

However, in an alternative arrangement, Phase 7, 1965, may be performed at a central location and the resulting integrated bytecode 76 transmitted to a user system and it is in this context that execution of the integrated bytecode 76 will now be described with reference to FIGS. 20 and 21.

Each instruction in the integrated bytecode 76 consists of an opcode specifying the operation to be performed, followed by zero or more operands supplying arguments or data to be used by the operation. As shown in FIG. 20, the first step in the execution of an instruction is to fetch the opcode, step 2090. At step 2100, it is determined whether the opcode fetched has any operands associated with it. If not, operation branches forward to step 2140 in which the operation specified by the opcode is executed.

If there are operands, operation proceeds to step 2110 in which the operands are fetched from the bytecode. Operation then proceeds to step 2120 in which it is determined whether any of the fetched operands need to be resolved. Generally, an operand will need to be resolved if it is not a literal constant. Opcodes that refer to classes, methods or fields have operands that need to be resolved. The type of operand is implied by the opcode. For example, the "putfield" operation takes a value of the stack and moves it into the field of an object. The operand which immediately follows the "putfield" operator in the bytecode is a field identifier which specifies the field. In bytecode condensed in accordance with the present invention, the operand will be an index into the appropriate canonical FieldList, ie. either the OriginalFieldList or the UpgradeFieldList.

If no operand needs to be resolved, operation proceeds to step 2140 in which the operation specified by the opcode is executed using the operands. If there are operands to be resolved, operation proceeds to step 2130 in which the operands are resolved. This procedure will be described in greater detail below with reference to FIG. 21. Once the operands have been resolved, operation continues to step 2140 in which the operation specified by the opcode is carried out with the resolved operands.

Once the current instruction is executed, it is determined in step 2150 whether there are more instructions in the integrated bytecode 76 to be executed. If there are, operation loops back to step 2090 in which the next opcode to be executed is fetched. If there are no more instructions to be executed, operation terminates at step 2160.

Figure 21:
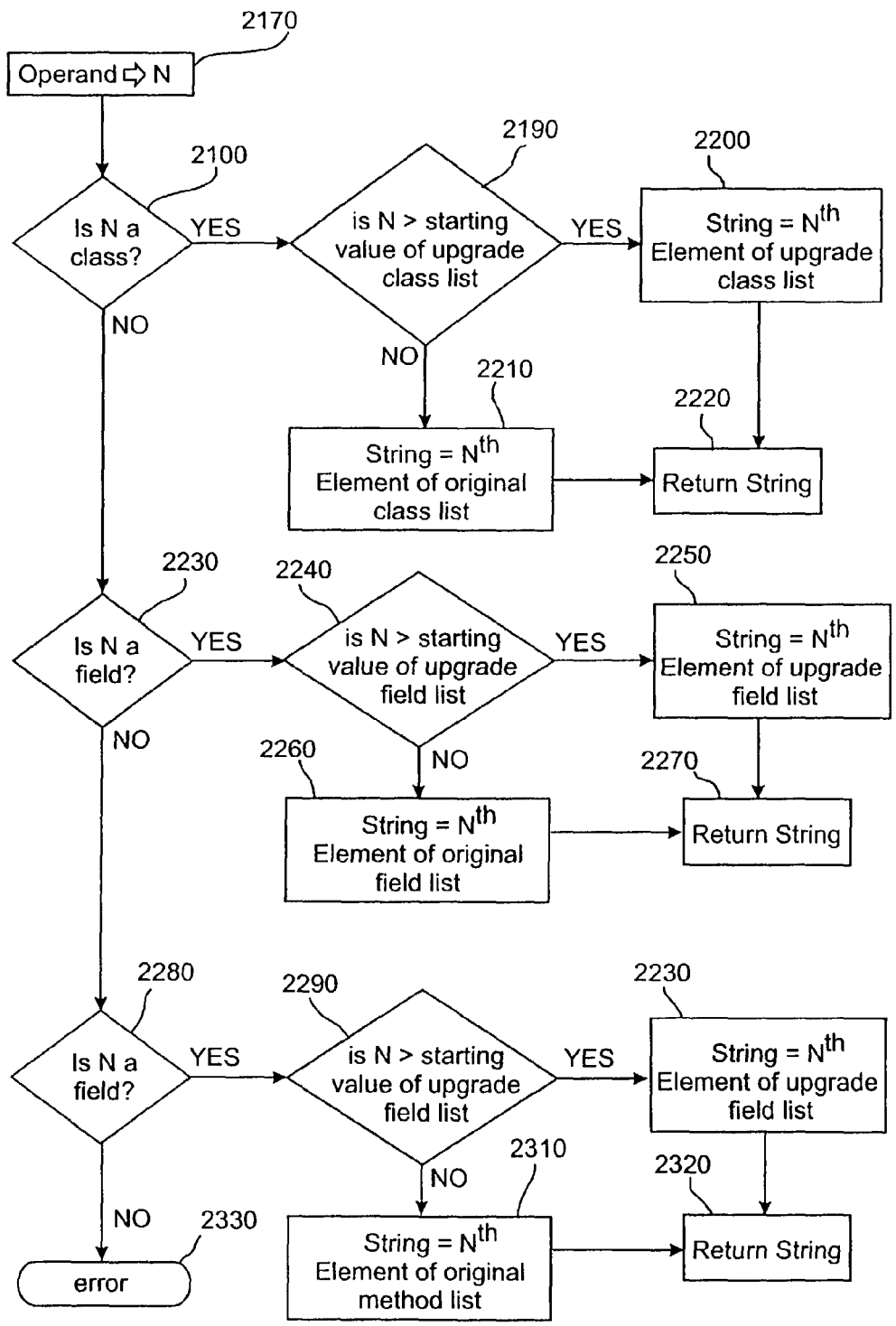
FIG. 21 is a flow diagram of an exemplary method of resolving operands of bytecode in the exemplary method of executing the combined bytecode illustrated in FIG. 20.

FIG. 21 illustrates an exemplary procedure for resolving operands in accordance with the present invention. In step 2170, the operand to be resolved is assigned to a variable N. In step 2180, it is determined whether the operand is a class. As discussed above, the type of operand is implied from the opcode. If the operand N is a class, operation proceeds to step 2190 where N is compared to the starting value of the UpgradeClassList. If N exceeds the starting value of the UpgradeClassList, processing continues to step 2200, otherwise processing continues to step 2210.

At step 2200, and using the operand as an index to the UpgradeClassList, a string is retrieved from the UpgradeClassList which is the identifier of the class which is the operand. At step 2210, and using the operand as an index to the OriginalClassList, a string is retrieved from the OriginalClassList which is the identifier of the class which is the operand. Regardless, of whether step 2200 or step 2210 is executed, processing continues to step 2220 where the retrieved string replaces the index and operation either proceeds to step 2140, if all operands that need to be resolved have been resolved, or to step 2170 if there are more operands to be resolved.

In the alternative, using the operand as an index, other attributes relevant to the instruction to be executed (e.g., object size, number of defined methods, superclass ID) which are stored in the appropriate ClassList (ie. the OriginalClassList or the UpgradeClassList) for the class which is the operand can be retrieved from the appropriate ClassList.

If at step 2180 it is determined that the operand N is not a class, operation proceeds to step 2230 in which it is determined whether the operand is a field. If the operand N is a field, operation proceeds to step 2240 where N is compared to the starting value of the UpgradeFieldList. If N exceeds the starting value of the UpgradeFieldList, processing continues to step 2250, otherwise processing continues to step 2260.

At step 2250, and using the operand as an index to the UpgradeFieldList, a string is retrieved from the UpgradeFieldList which is the identifier of the field which is the operand. At step 2260, and using the operand as an index to the OriginalFieldList, a string is retrieved from the OriginalFieldList which is the identifier of the field which is the operand. Regardless, of whether step 2250 or step 2260 is executed, processing continues to step 2270 where the retrieved string replaces the index and operation either proceeds to step 2140, if all operands that need to be resolved have been resolved, or to step 2170 if there are more operands to be resolved.

In the alternative, using the operand as an index, other attributes relevant to the instruction to be executed (e.g., offset within object and length) which are stored in the appropriate FieldList (i.e. the OriginalFieldList or the UpgradeFieldList) for the field which is the operand can be retrieved from the appropriate FieldList.

If at step 2230 it is determined that the operand N is not a field, operation proceeds to step 2280 in which it is determined whether the operand is a method. If the operand N is a method, operation proceeds to step 2290 where N is compared to the starting value of the UpgradeMethodList. If N exceeds the starting value of the UpgradeMethodList, processing continues to step 2300, otherwise processing continues to step 2310.

At step 2300, and using the operand as an index to the UpgradeMethodList, a string is retrieved from the UpgradeMethodList which is the identifier of the method which is the operand. At step 2310, and using the operand as an index to the OriginalMethodList, a string is retrieved from the OriginalMethodList which is the identifier of the method which is the operand. Regardless, of whether step 2300 or step 2310 is executed, processing continues to step 2320 where the retrieved string replaces the index and operation either proceeds to step 2140, if all operands that need to be resolved have been resolved, or to step 2170 if there are more operands to be resolved.

In the alternative, using the operand as an index, other attributes relevant to the instruction to be executed (e.g., number of arguments, and length and location of bytecode) which are stored in the appropriate MethodList (i.e., the OriginalMethodList or the UpgradeMethodList) for the method which is the operand can be retrieved from the appropriate MethodList.

If in step 2280 it is determined that the operand N is not a method, then an error condition is indicated in step 2330. In the exemplary embodiment of the present invention, the bytecode 72 has operands which are classes, methods or fields.

It should be noted that integrated bytecode 76 concentrated in accordance with the present invention can be interpreted and executed, as-is, without the class, method and field lists. For example, if class #5 has four methods, the third of which is method #778, and this method creates new objects of class type #7, and class type #7 creates this object's method #556, the original names or identifiers of classes 5 or 7, or of methods 778 or 556 are not needed to properly interpret and execute the bytecode.

It is possible to use the invention described herein for multiple upgrades of the original bytecode 72. When doing so the integrated bytecode 76 formed from previous upgrades constitutes the original bytecode 72. Further, in such an arrangement and depending on the number of entries added or upgraded, subsequent upgrades can commence at a set index step, i.e., the second upgrade can commence at 200, the third at 300, etc. Such partitioning also allows for easier location of the appropriate class/method/field reference when resolving operands.

One skilled in the art will appreciate that the present invention can be practiced by other than the preferred embodiments, which are presented for purposes of illustration and not of limitation.

We claim:

1. A method of updating a concentrated executable computer code in a computer system without a reconcentration of the concentrated computer code, the concentrated code including a plurality of types of code structures having respective code identifiers, wherein the concentrated code is associated with a first indexed list of first identifiers for a first type of code structures in the concentrated code, the first indexed list having a plurality of index references and a plurality of upgrade flags, and the computer system including a memory for storing the concentrated code and an upgrade code for updating the concentrated code, the upgrade code also including a plurality of corresponding types of code structures having respective identifiers, the method comprising:

creating a first indexed upgrade list of first identifiers for the first type of code structures in the upgrade code, the first indexed upgrade list including a plurality of index references;

comparing the first identifiers in the first indexed list with the first identifiers in the first indexed upgrade list and setting a corresponding upgrade flag in the first indexed list to a value indicating that a corresponding first identifier has been upgraded if a positive comparison is made;

integrating the concentrated code with the upgrade code to form an integrated code; and executing the integrated code, wherein when the integrated code refers to an index reference having a corresponding entry in the first indexed list and the first identifier corresponding to the index reference of the integrated code has a corresponding upgrade flag set to a value indicating that the first identifier has been upgraded, the integrated code is diverted to the corresponding first identifier in the first indexed upgrade list for execution of the corresponding first type of code structure.

2. The method of claim 1, further comprising scanning the upgrade code to find first identifiers of the first type of code structures for inclusion in the first indexed upgrade list.

3. The method of claim 1, wherein the concentrated code further includes a second indexed list of second identifiers for a second type of code structures, the second indexed list including a plurality of index references and a plurality of upgrade flags, and the method further comprises:

creating a second indexed upgrade list of the second identifiers for the second type of code structures, the second indexed upgrade list including a plurality of index references;

comparing the second identifiers in the second indexed list with the second identifiers in the second indexed upgrade list and setting a corresponding upgrade flag in the second indexed list to a value indicating that a corresponding second identifier has been upgraded if a positive comparison is made, and wherein, during execution of the integrated code, when the integrated code refers to a second index reference having a corresponding entry in the second indexed list and the second identifier corresponding to the second index reference has its corresponding upgrade flag set to a value indicating that the second identifier has been upgraded, the integrated code is diverted to the corresponding second identifier in the second indexed upgrade list for execution of the corresponding second type of code structure.

4. A method of updating concentrated executable computer code with upgrade code in a computer system without a reconcentration of the concentrated code, the method comprising:

creating a first indexed list having a plurality of index references for code identifiers in the concentrated code to be updated, and creating a first indexed upgrade list having a plurality of index references for corresponding identifiers in the upgrade code, the first indexed list further having upgrade flags to indicate whether corresponding code identifiers have been upgraded;

selectively substituting the code identifiers in the concentrated code with corresponding index references from the first indexed list;

integrating the concentrated code and the upgrade code into an integrated code; and executing the integrated code, wherein when the integrated code refers to an index reference included in the first indexed list and the code identifier corresponding to the index reference has a corresponding upgrade flag set to a value indicating that the code identifier has been upgraded, the integrated code is diverted to the corresponding identifier in the first indexed upgrade list.

5. The method of claim 4, further comprising:

comparing code indetifiers of the first indexed list with corresponding identifiers in the first indexed upgrade list; and setting a state of an upgrade flag to indicate the respective code identifier has been upgraded in response to determining from the comparing that a respective code identifier in the first indexed list matches a corresponding identifier in the first indexed upgrade list.

6. The method of claim 4, further comprising substituting identifiers of code structures in the upgrade code with respective index reference prior to intergrating the concentrated code with the upgrade code.

7. The method of claim 4, wherein the code structures comprises classes, wherein creating the first indexed list comprises creating the first indexed list having the plurality of index reference for code identifiers of respective classes in the concentrated code, and wherein creating the first indexed upgrade list comprises creating the first indexed upgrade list having the plurality of index reference for corresponding identifiers of respective classes in the upgrade code.

8. The method of claim 7, wherein the code structure further comprises method-type code structures, the method further comprising:

creating a second indexed list having a plurality of index reference for respective code identifiers of the method-type code structures in the concentrated code, wherein the second indexed list further has upgrade flags to indicate whether corresponding code identifiers of the method-type code structures have been upgraded; and creating a second indexed upgrade list having a plurality of index references for corresponding identifiers of the method-type code structures in the upgrade code.

9. The method of claim 8, further comprising executing the intergrated code, wherien the first and second indexed lists and first and second indexed upgrade lists are accessed during execution of the intergrated code.

10. A data storage medium, comprising machine readable code thereon for use in a computer system having memory to store a concentrated executable computer code and an upgrade code for updating the concentrated code, wherein the concentrated code has first type code structures, the machine readable code when executed causing the computer system to:

create a first indexed list of a plurality of index references corresponding to first identifiers of the first type code structures in the concentrated code, the first indexed list further containing upgrade flags to indicate whether corresponding first type code structures identified by the first identifiers have been upgraded;

create a first indexed upgrade list of a plurality of index references corresponding to first identifiers of the first type code structures in the upgrade code;

set a state of each upgrade flag to indicate whether a corresponding first identifier in the first indexed list has been upgraded based on comparing the first identifiers in the first indexed upgrade list with the first identifiers in the first indexed list;

integrate the concentrated code with the upgrade code to form integrated code; and execute the integrated code, wherein when the integrated code refers to an index reference included in the first indexed list and the code identifier corresponding to the index reference has a corresponding upgrade flag set to a value indicating that the code identifier has been upgraded, the integrated code is diverted to the corresponding identifier in the first indexed upgrade list.

11. A data processing system comprising:

storage to store concentrated code and upgrade code to update the concentrated code; and at least one processor to:

create a first indexed list of a plurality of index references corresponding to first identifiers of the first type code structures in the concentrated code, the first indexed list further containing upgrade flags to indicate whether corresponding first type code structures identified by the first identifiers have been upgraded;

create a first indexed upgrade list of a plurality of index references corresponding to first identifiers of the first type code structures in the upgrade code;

set a state of each upgrade flag to indicate whether a corresponding first identifier in the first indexed list has been upgraded based on comparing the first identifiers in the first indexed upgrade list with the first identifiers in the first indexed list;

integrate the concentrated code with the upgrade code to form integrated code; and execute the integrated code, wherein when the integrated code refers to an index reference included in the first indexed list and the code identifier corresponding to the index reference has a corresponding upgrade flag set to a value indicating that the code identifier has been upgraded, the integrated code is diverted to the corresponding identifier in the first indexed upgrade list.

* * * * *